(12) United States Patent
Tanaka et al.

(10) Patent No.: US 8,855,498 B2
(45) Date of Patent: Oct. 7, 2014

(54) SKEW SUPPRESSION METHOD AND OPTICAL TRANSMISSION SYSTEM

(75) Inventors: Toshiki Tanaka, Kawasaki (JP); Masato Nishihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 301 days.

(21) Appl. No.: 13/369,365

(22) Filed: Feb. 9, 2012

(65) Prior Publication Data

US 2012/0263456 A1 Oct. 18, 2012

(30) Foreign Application Priority Data

Apr. 13, 2011 (JP) ................................. 2011-089131

(51) Int. Cl.
*H04B 10/00* (2013.01)
*H04B 10/08* (2006.01)
*H04B 10/50* (2013.01)

(52) U.S. Cl.
CPC ...... *H04B 10/5055* (2013.01); *H04B 2210/254* (2013.01)
USPC ............................................ 398/159; 398/25

(58) Field of Classification Search
USPC .................................................. 398/25, 189
See application file for complete search history.

(56) References Cited

U.S. PATENT DOCUMENTS

| 6,081,360 | A * | 6/2000 | Ishikawa et al. | 398/147 |
| 6,320,687 | B1 * | 11/2001 | Ishikawa | 398/147 |
| 7,295,783 | B2 * | 11/2007 | Singh et al. | 398/175 |
| 7,433,604 | B1 * | 10/2008 | Kim et al. | 398/188 |
| 7,596,323 | B1 * | 9/2009 | Price et al. | 398/141 |
| 7,636,525 | B1 * | 12/2009 | Bontu et al. | 398/208 |
| 7,986,878 | B2 * | 7/2011 | Saunders et al. | 398/26 |
| 8,145,071 | B2 * | 3/2012 | Tanaka et al. | 398/209 |
| 2002/0018268 | A1 * | 2/2002 | Price et al. | 359/161 |
| 2003/0025971 | A1 * | 2/2003 | Price et al. | 359/181 |
| 2005/0031355 | A1 * | 2/2005 | Shi et al. | 398/147 |
| 2005/0271393 | A1 * | 12/2005 | Gnauck et al. | 398/186 |
| 2006/0002714 | A1 * | 1/2006 | Gill et al. | 398/147 |
| 2007/0196110 | A1 * | 8/2007 | Mikkelsen et al. | 398/140 |
| 2008/0175586 | A1 * | 7/2008 | Perkins et al. | 398/2 |
| 2008/0175590 | A1 * | 7/2008 | Perkins et al. | 398/58 |
| 2008/0279564 | A1 * | 11/2008 | Han et al. | 398/152 |

(Continued)

FOREIGN PATENT DOCUMENTS

JP 2010-193204 A 9/2010

OTHER PUBLICATIONS

Buchali, Fred "Technologies towards terabit transmission systems", Optical Communication (ECOC), 2010 36th European Conference and Exhibition on Sep. 19, 2010, pp. 1-24.

(Continued)

*Primary Examiner* — Kenneth Vanderpuye
*Assistant Examiner* — Abbas H Alagheband
(74) *Attorney, Agent, or Firm* — Fujitsu Patent Center

(57) ABSTRACT

A method for suppressing a skew between a first channel and a second channel in an optical transmission system having a transmitter that transmits an optical signal with the first channel and the second channel and a receiver that receives the optical signal, the method includes: controlling dispersion added to the optical signal to be larger than a specified amount; and controlling a delay time of at least one of the first channel and the second channel in the receiver based on a quality of the optical signal monitored in the receiver to suppress the skew between the first channel and the second channel in the receiver.

8 Claims, 32 Drawing Sheets

(56) References Cited

U.S. PATENT DOCUMENTS

| | | |
|---|---|---|
| 2009/0052892 A1* | 2/2009 | Perkins et al. .................. 398/34 |
| 2009/0148170 A1* | 6/2009 | Perkins ......................... 398/152 |
| 2009/0190933 A1* | 7/2009 | Fichter et al. ................. 398/159 |
| 2009/0196602 A1* | 8/2009 | Saunders et al. ............... 398/26 |
| 2009/0226165 A1* | 9/2009 | Tanaka et al. .................. 398/25 |
| 2009/0304391 A1* | 12/2009 | Harley et al. ................. 398/147 |
| 2010/0061738 A1* | 3/2010 | Giorgi et al. .................. 398/149 |
| 2010/0178065 A1* | 7/2010 | Nishihara et al. ............. 398/202 |
| 2010/0209121 A1* | 8/2010 | Tanimura ...................... 398/202 |
| 2010/0220828 A1* | 9/2010 | Fuller et al. ................... 375/355 |
| 2011/0129230 A1* | 6/2011 | Zanoni et al. ................. 398/140 |
| 2011/0280588 A1* | 11/2011 | Mikkelsen et al. ........... 398/202 |
| 2011/0293287 A1* | 12/2011 | Fukuchi ........................ 398/147 |
| 2014/0161470 A1* | 6/2014 | Zelensky et al. .............. 398/208 |

OTHER PUBLICATIONS

Shirasaki, M. "A virtually imaged phased array with tapered reflectivity", Lasers and Electro-Optics Society Annual Meeting, 1998. LEOS '98. IEEE, vol. 1, Dec. 1, 1998, pp. 313-314.

* cited by examiner

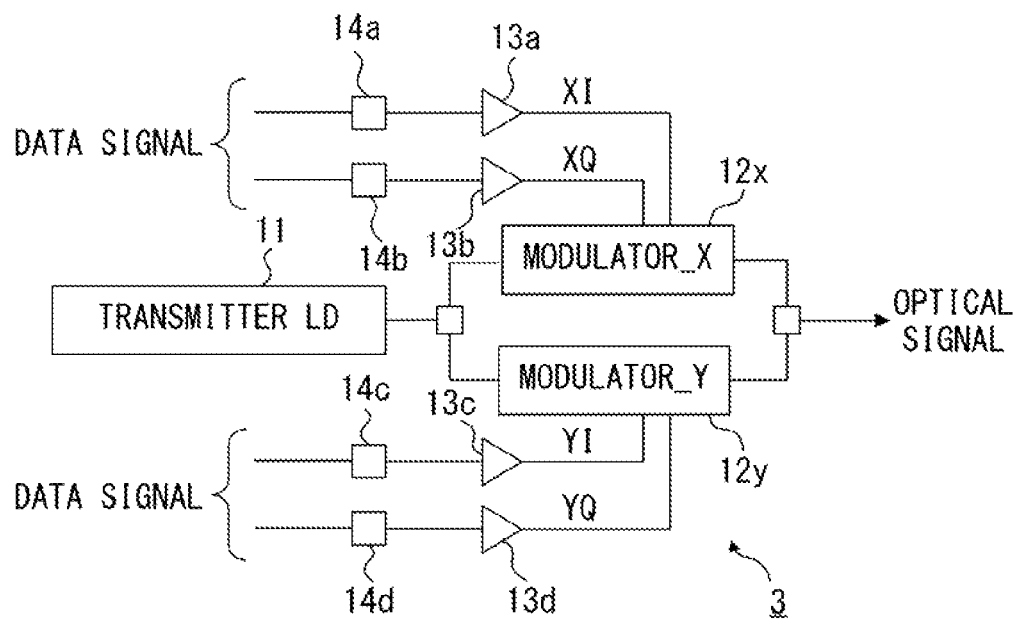
F I G. 2

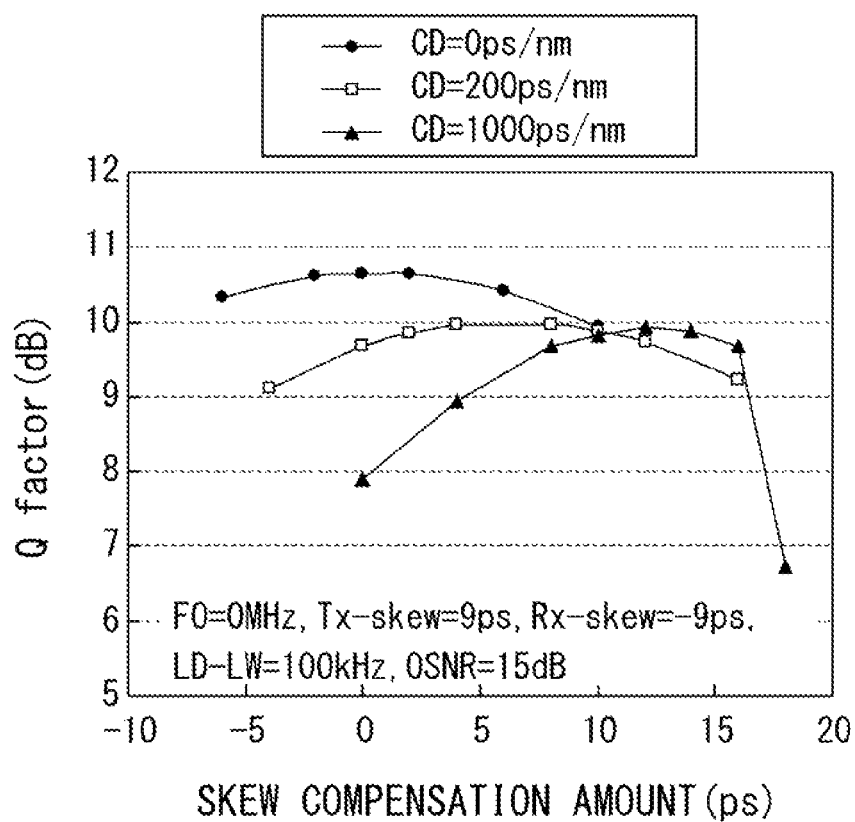
F I G. 4

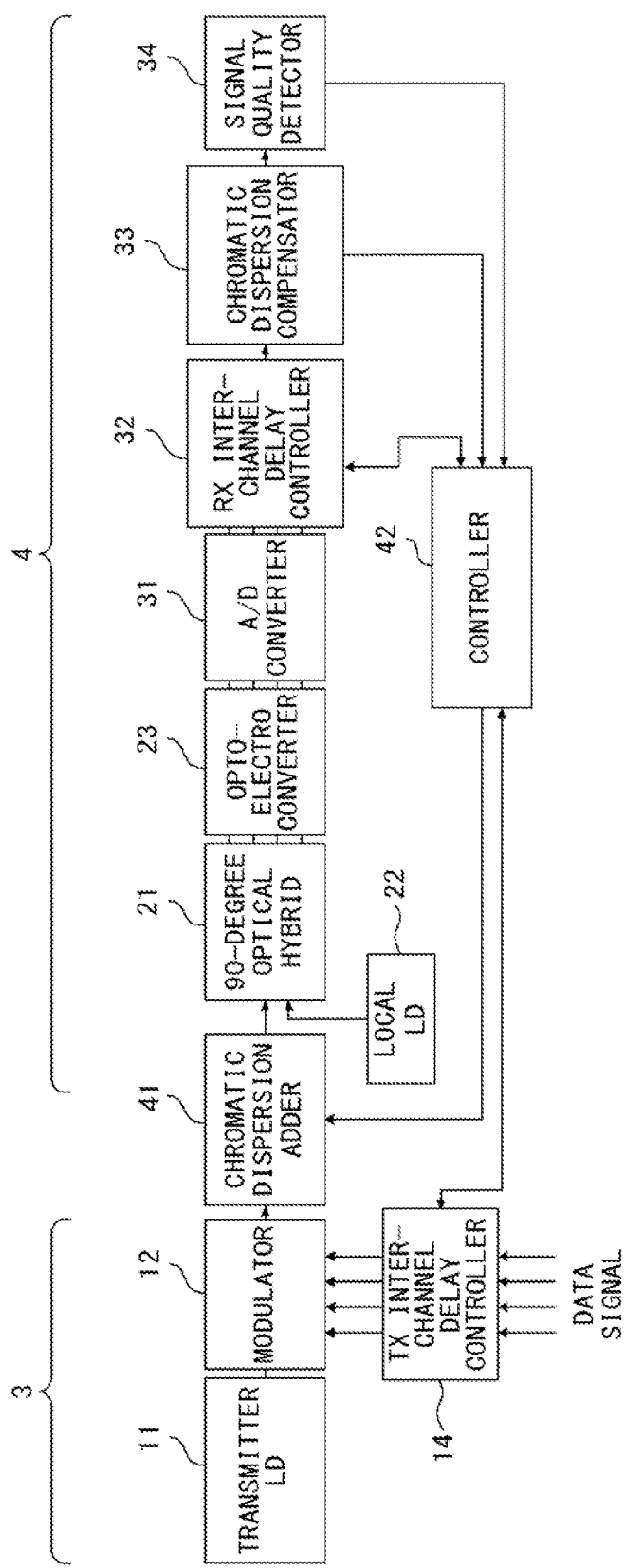
F I G. 6

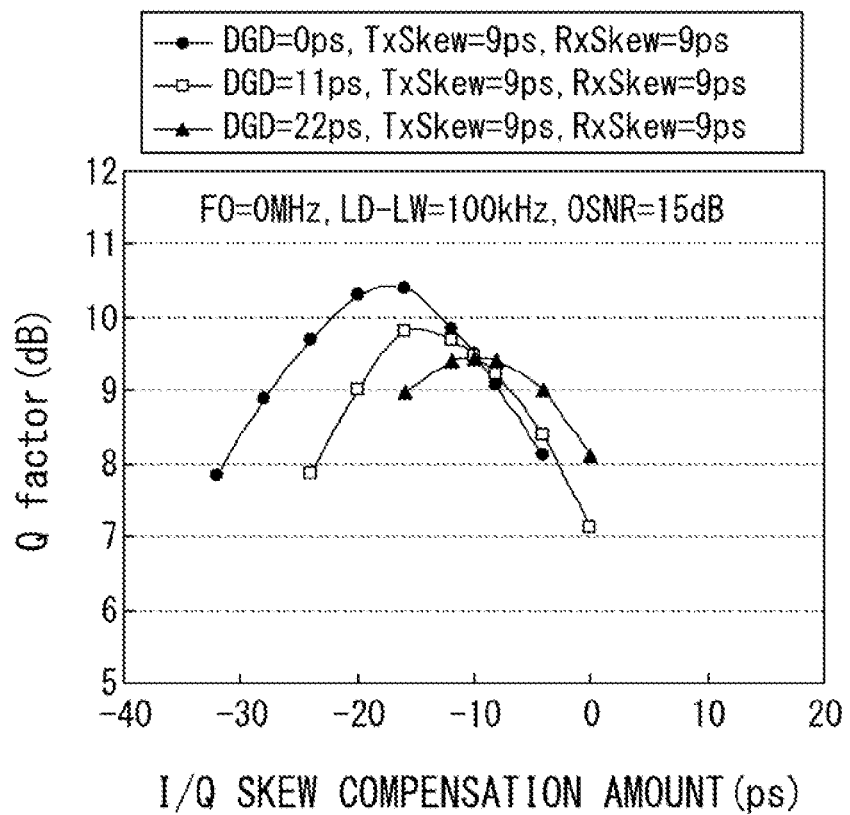
F I G. 10

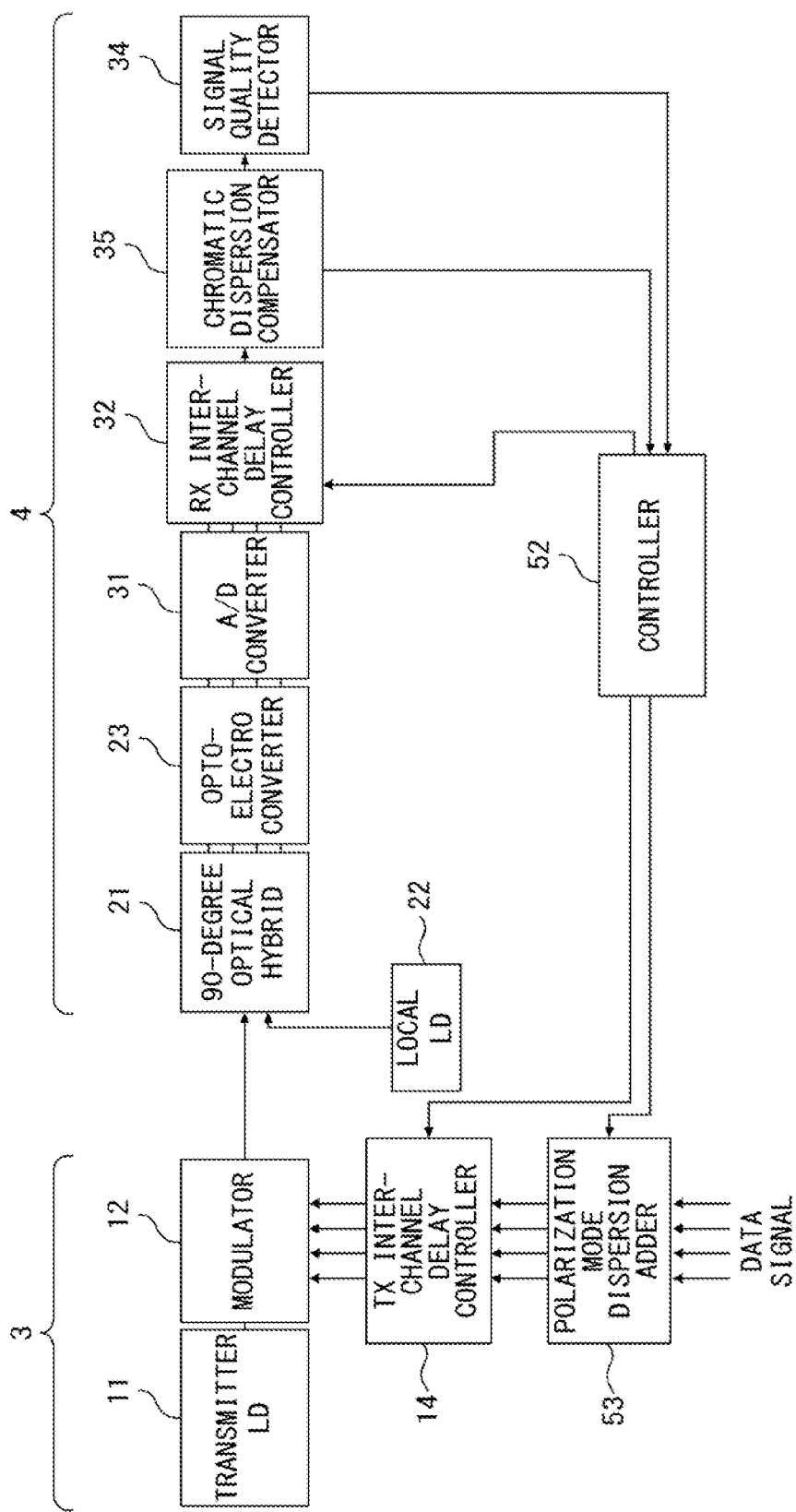
F I G. 13

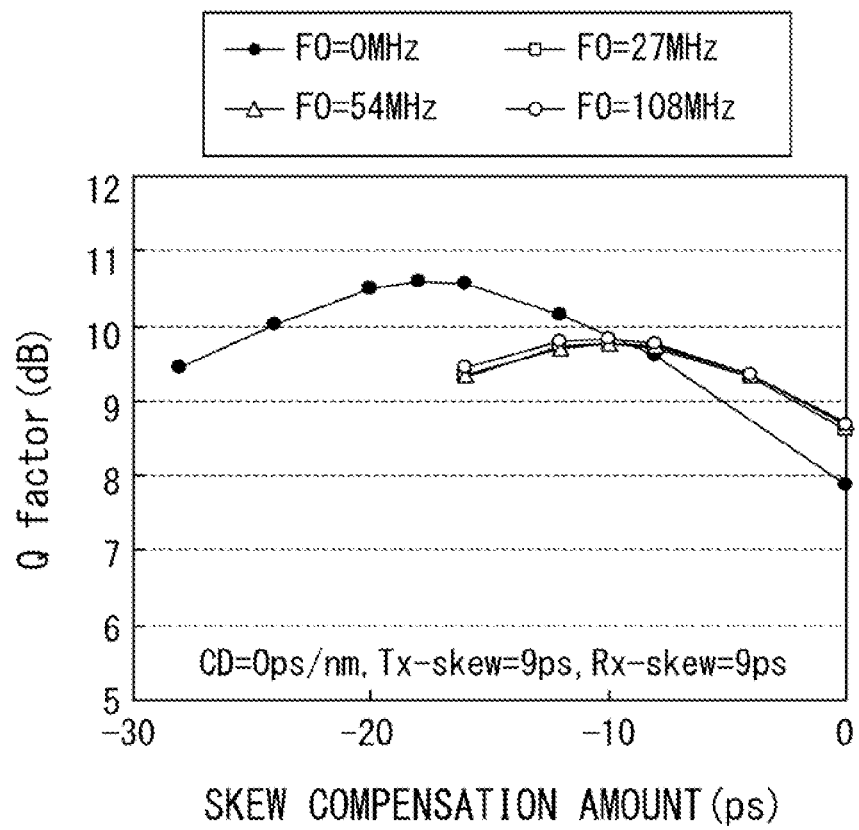
F I G. 1 4

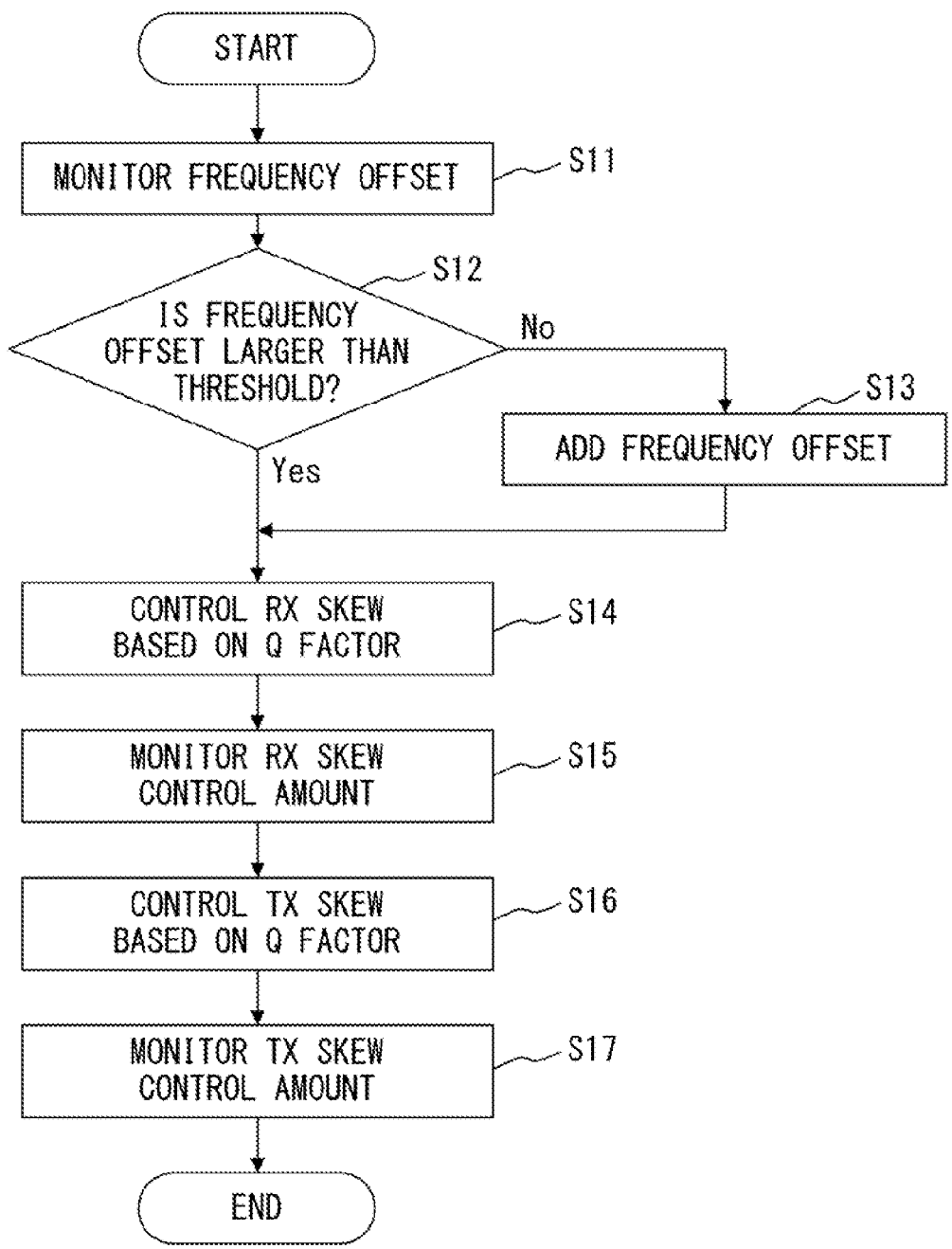
F I G. 17

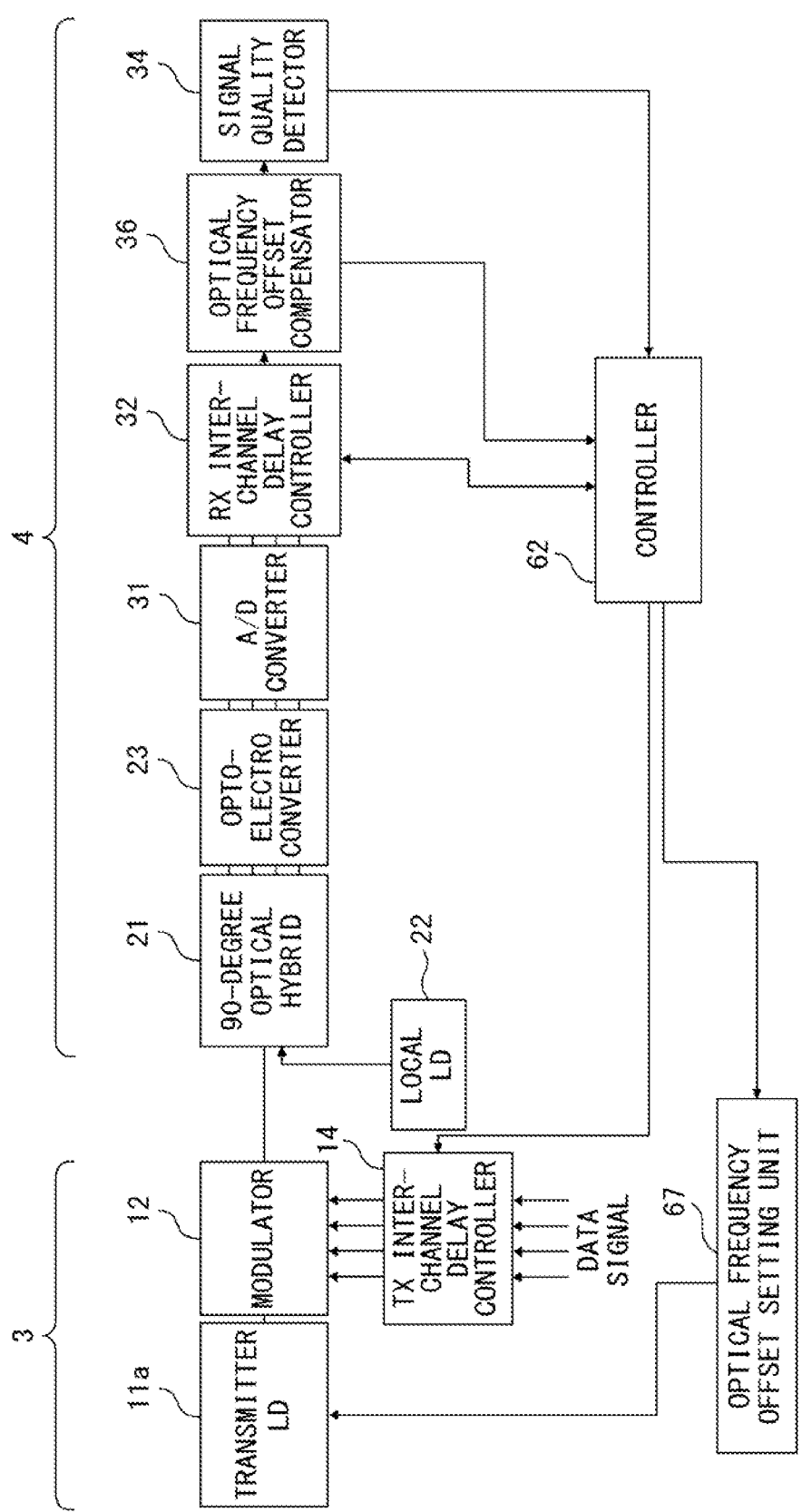
F I G. 2 1

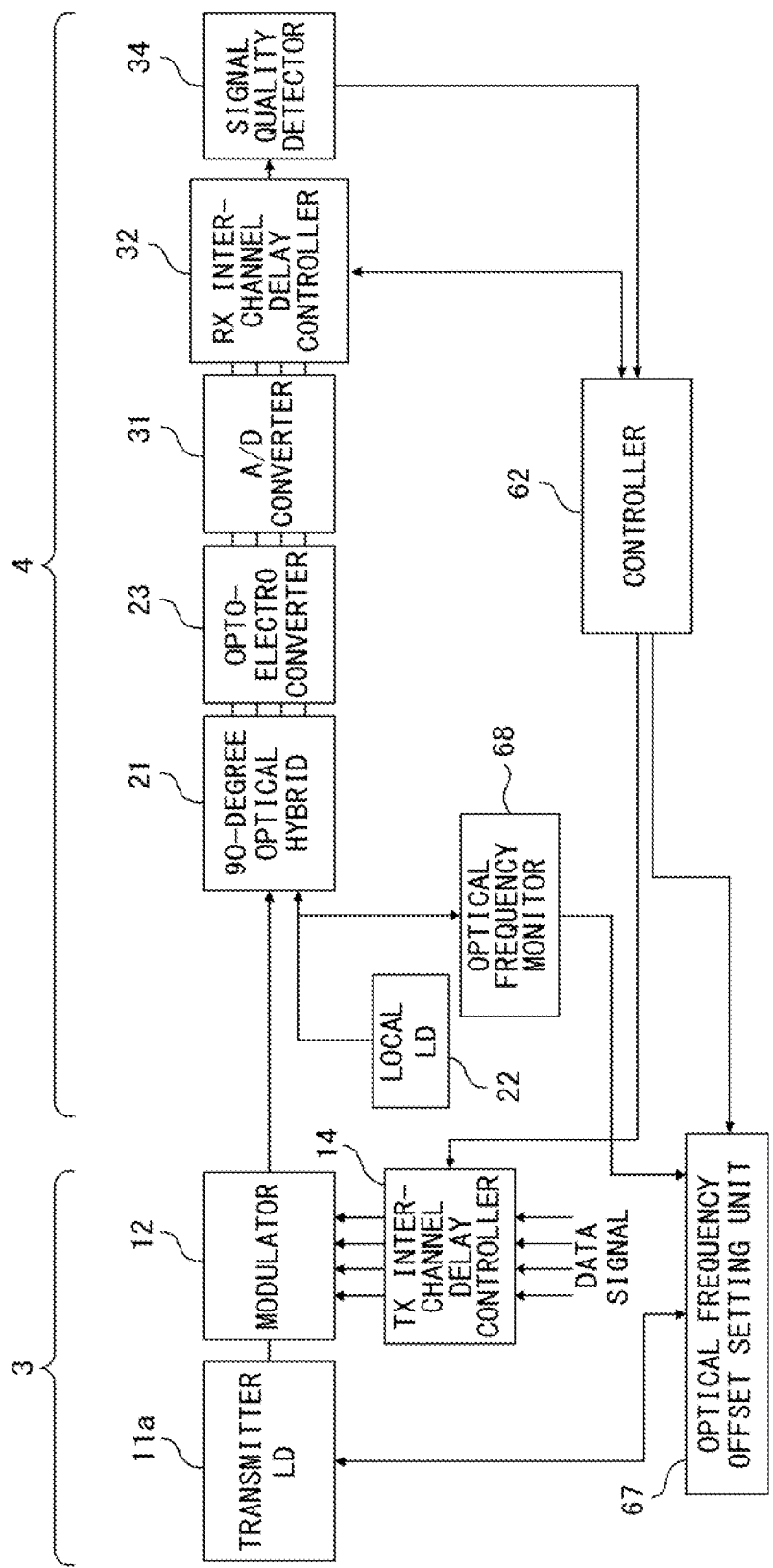
F I G. 2 2

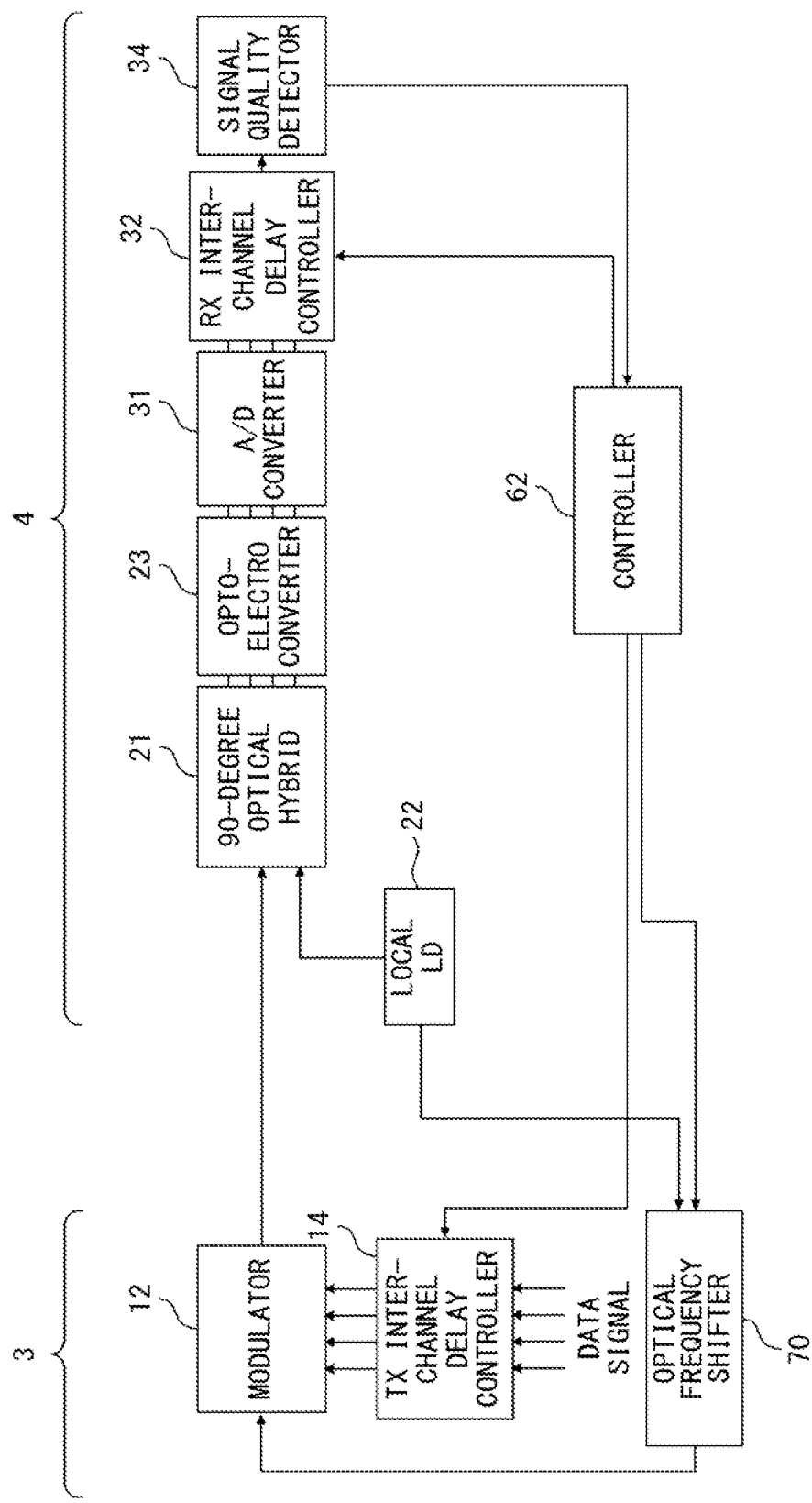
F I G. 2 4

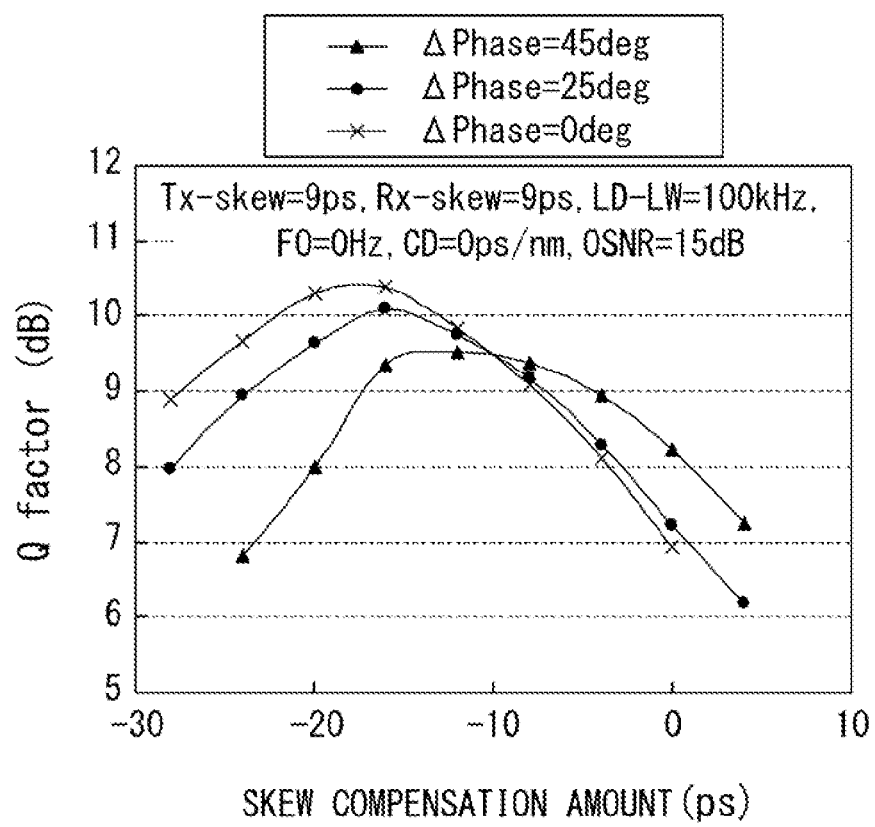
F I G. 2 6

SKEW SUPPRESSION METHOD AND OPTICAL TRANSMISSION SYSTEM

CROSS-REFERENCE TO RELATED APPLICATION

This application is based upon and claims the benefit of priority of the prior Japanese Patent Application No. 2011-089131, filed on Apr. 13, 2011, the entire contents of which are incorporated herein by reference.

FIELD

The embodiments described herein are related to a technique of suppressing skew between channels in an optical transmission system.

BACKGROUND

In recent years, a digital coherent receiver has been developed to provide a large-capacity optical transmission system that enables long-haul transmission. A digital coherent receiver, which performs digital coherent reception, includes an optical front-end circuit and a digital signal processor. The optical front-end circuit generates a digital signal indicating a modulated optical signal using local light generated by a local light source. The digital signal includes a plurality of channels (I signal and Q signal respectively indicating an I-component and a Q-component of the modulated optical signal) for each polarization. The digital signal processor recovers data from the digital signal generated by the optical front-end circuit (i.e., I signal and Q signal). At this time, the digital signal processor may recover phase and/or compensate for dispersion.

In such a digital coherent receiver, skew (delay time difference) may be generated between digital signals of respective channels input to the digital signal processor. For example, the skew is caused by variation in length of signal lines between the optical front-end circuit and the digital signal processor or variation in characteristics of amplifiers provided for the respective channels. The skew may adversely affect the quality of signals recovered by the digital signal processor. The skew between the channels may also be generated in an optical transmitter.

Thus, a signal processing device for compensating for skew has been suggested. The suggested signal processing device includes a skew detector which detects a skew remaining between an in-phase signal and a quadrature signal output from a phase controller, and a control amount determining unit which determines a control amount in a phase controller by using a detection result of the skew by the skew detector and outputs the control amount to the phase controller (for example, Japanese Laid-Open Patent Publication No. 2010-193204).

To further improve spectral efficiency in an optical transmission system using a coherent receiver, a technique of increasing a multi-level degree of multi-level modulation or a technique of adopting OFDM has been studied. Also, to ensure the favorable quality of transmission by adopting such a technique, the quality of laser mounted in a transmitter and receiver has been improved. For example, laser frequency variation, phase noise, and line width have been improved.

By improving the quality of laser, however, characteristics variation in the transmission system may become obvious. For example, when skew is generated in both of an optical transmitter and an optical receiver and frequencies and phases of lasers mounted in the optical transmitter and the optical receiver substantially correspond to each other, the skew in the optical transmitter and the skew in the optical receiver may be accumulated or canceled by each other depending on operation conditions of the optical transmission system.

Thus, the optimum skew compensation amount is changed when the combination of the optical transmitter and the optical receiver is changed or when the system condition (laser frequency fluctuation or the like) is changed. Consequently, the characteristics of the optical transmission system may be deteriorated.

SUMMARY

According to an aspect of the invention, a method for suppressing a skew between a first channel and a second channel in an optical transmission system having a transmitter that transmits an optical signal with the first channel and the second channel and a receiver that receives the optical signal, the method includes: controlling dispersion added to the optical signal to be larger than a specified amount; controlling a delay time of at least one of the first channel and the second channel in the receiver based on a quality of the optical signal monitored in the receiver to suppress the skew between the first channel and the second channel in the receiver; and controlling a delay time of at least one of the first channel and the second channel in the transmitter based on a quality of the optical signal monitored in the receiver to suppress the skew between the first channel and the second channel in the transmitter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of a configuration of a transmitter;

FIG. 4 illustrates a relationship among skew, chromatic dispersion, and Q factor;

FIG. 6 illustrates a configuration of an optical transmission system for providing a skew suppression method according to a first embodiment;

FIG. 10 illustrates a relationship among skew, polarization mode dispersion, and Q factor;

FIG. 13 illustrates a configuration of an optical transmission system for providing a skew suppression method according to a fourth embodiment;

FIG. 14 illustrates a relationship among skew, frequency offset, and Q factor;

FIG. 17 is a flowchart illustrating the skew suppression method according to the fifth embodiment;

FIG. 21 illustrates a configuration of an optical transmission system for providing a skew suppression method according to a ninth embodiment;

FIG. 22 illustrates a configuration of an optical transmission system for providing a skew suppression method according to a 10th embodiment;

FIG. 24 illustrates a configuration of an optical transmission system for providing a skew suppression method according to a 12th embodiment;

FIG. 26 illustrates a relationship among skew, optical phase difference, and Q factor;

DESCRIPTION OF EMBODIMENTS

Figure 1:
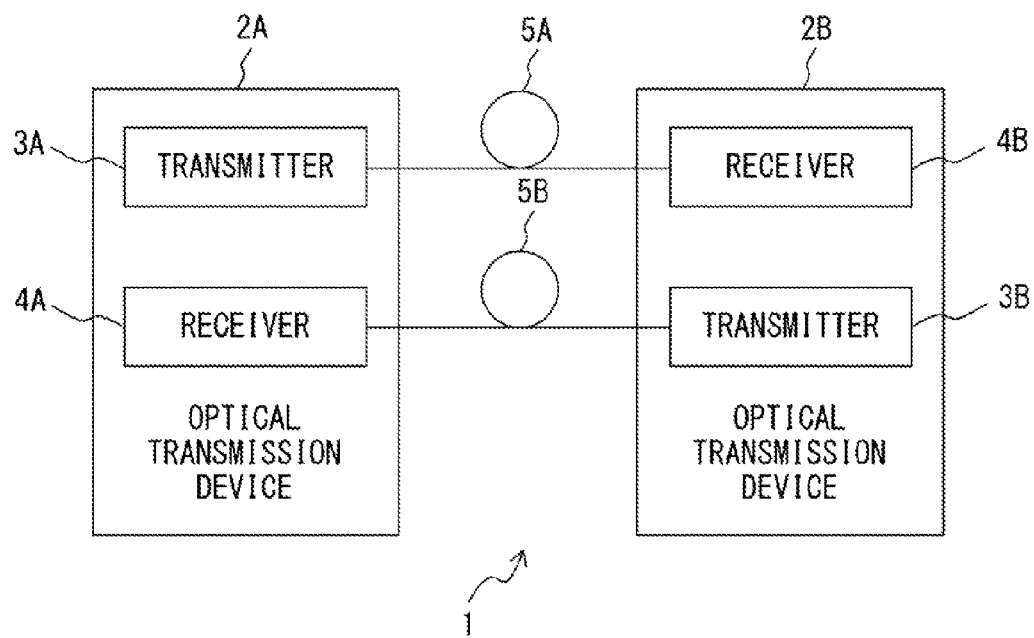
FIG. 1 illustrates a configuration of an optical transmission system according to embodiments.

FIG. 1 illustrates a configuration of an optical transmission system according to embodiments. The optical transmission system 1 according to the embodiments includes optical transmission devices 2A and 2B. The optical transmission device 2A includes a transmitter 3A and a receiver 4A, and the optical transmission device 2B includes a transmitter 3B and a receiver 4B. An optical signal is transmitted from the transmitter 3A via an optical fiber transmission line 5A and is received by the receiver 4B. Another optical signal is transmitted from the transmitter 3B via an optical fiber transmission line 5B and is received by the receiver 4A. An optical relay node or an optical amplifier may be provided on each optical fiber transmission line 5A, 5B. A method of modulating the optical signal transmitted between the optical transmission devices 2A and 2B is not particularly limited, but whatever may be made by I/Q modulator, for example, QPSK, DP-QPSK, 16QAM or 64QAM.

FIG. 2 illustrates an example of a configuration of a transmitter. The transmitter 3 illustrated in FIG. 2 corresponds to the transmitters 3A and 3B in FIG. 1. The transmitter 3 generates a DP-QPSK modulated optical signal.

The transmitter 3 includes a transmitter LD 11, optical modulators 12x and 12y, and amplifiers 13a-13d. The transmitter LD 11 is a laser source which generates carrier light with a specified frequency. The carrier light may be, for example, CW (Continuous Wave) light. The carrier light generated by the transmitter LD 11 is branched by an optical splitter to be guided to the optical modulators 12x and 12y.

The optical modulators 12x and 12y are QPSK optical modulators. For example, the optical modulators 12x and 12y may be Mach-Zehnder modulators. The optical modulator 12x modulates the input carrier light with an I-channel signal and a Q-channel signal to generate a QPSK modulated optical signal. Similarly, the optical modulator 12y modulates the input carrier light with an I-channel signal and a Q-channel signal to generate a QPSK modulated optical signal. The I-channel signal and the Q-channel signal given to the optical modulator 12x are denoted by XI and XQ in FIG. 2. Also, the I-channel signal and the Q-channel signal given to the optical modulator 12y are denoted by YI and YQ in FIG. 2. The transmitter 3 polarization-multiplexes the QPSK modulated optical signals generated by the optical modulators 12x and 12y to generate a DP-QPSK modulated optical signal.

The amplifiers 13a, 13b, 13c, and 13d amplify the XI channel signal, XQ channel signal, YI channel signal, and YQ channel signal, respectively. However, it is not always required that the transmitter 3 includes the amplifiers 13a-13d.

In the transmitter 3 having the above-described configuration, a timing error of the I-channel signal and the Q-channel signal given to the optical modulators 12x and 12y may be occurred. For example, there is a timing error between the XI channel signal and the XQ channel signal given to the optical modulator 12x. In other words, a skew between I/Q may be generated. The skew between I/Q is caused by variation in length of signal lines from a data generator (not illustrated) to the optical modulators 12x and 12y, variation in characteristics of the amplifiers 13a-13d, or the like.

To reduce the skew between I/Q, the transmitter 3 includes delay control elements 14a-14d. The delay control elements 14a-14d will be explained later in detail.

Figure 3:
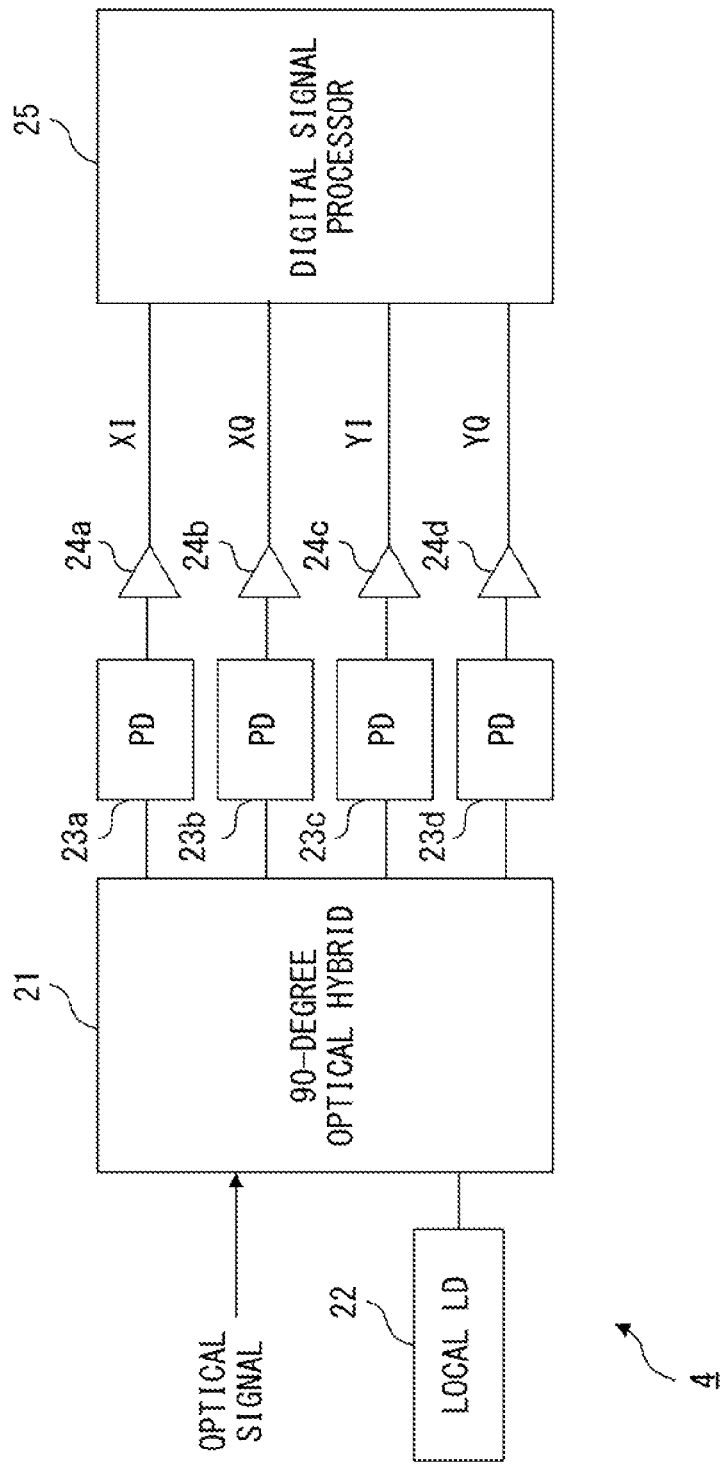
FIG. 3 illustrates an example of a configuration of a receiver.

FIG. 3 illustrates an example of a configuration of a receiver. The receiver 4 illustrated in FIG. 3 corresponds to the receivers 4A and 4B illustrated in FIG. 1.

The receiver 4 includes a 90-degree optical hybrid circuit 21, a local LD 22, photo detectors 23a-23d, amplifiers 24a-24d, and a digital signal processor (DSP) 25. An optical signal transmitted from the transmitter 3 is inputted to the 90-degree optical hybrid circuit 21.

The local LD 22 is a laser source which generates local light with a specified frequency. The local light may be, for example, CW light. The local light is used to receive an optical signal transmitted from the transmitter 3. The local light generated by the local LD 22 is guided to the 90-degree optical hybrid circuit 21.

The 90-degree optical hybrid circuit 21 generates X polarized local light and Y polarized local light which are orthogonal to each other from the local light. The 90-degree optical hybrid circuit 21 extracts an I-component and a Q-component of an X polarized QPSK modulated optical signal from the input optical signal using the X polarized local light. The 90-degree optical hybrid circuit 21 also extracts an I-component and a Q-component of a Y polarized QPSK modulated optical signal from the input optical signal using the Y polarized local light. The X polarized QPSK modulated optical signal corresponds to the QPSK modulated optical signal generated by the optical modulator 12x, and the Y polarized QPSK modulated optical signal corresponds to the QPSK modulated optical signal generated by the optical modulator 12y.

The photo detectors 23a-23d convert optical signals output from the 90-degree optical hybrid circuit 21 to electrical signals, respectively. More specifically, the photo detectors 23a and 23b output the electrical signals indicating the I-component and Q-component of the X polarized QPSK modulated light signal, respectively. Also, the photo detectors 23c and 23d output the electrical signals indicating the I-component and Q-component of the Y polarized QPSK modulated light signal, respectively. The amplifiers 24a-24d amplify the output signals from the photo detectors 23a-23d, respectively. I and Q components of the X polarized QPSK modulated optical signal may be referred to as XI and XQ channel signals, respectively. Similarly, I and Q components of the Y polarized QPSK modulated optical signal may be referred to as YI and YQ channel signals, respectively.

The digital signal processor 25 includes an A/D converters to convert the XI channel signal, XQ channel signal, YI channel signal, YQ channel signal obtained from the photo detectors 23a-23d into digital signals. Then, the digital signal processor 25 demodulates the XI channel signal, XQ channel signal, YI channel signal, YQ channel signal by digital signal processing and recovers transmission data. Note that the A/D converters may be provided on an input side of the digital signal processor 25.

In the receiver 4 having the above-described configuration, a timing error of the I-channel signal and the Q-channel signal given to the digital signal processor 25 may be occurred. In other words, a skew between I/Q may be generated in the receiver 4. The skew between I/Q is caused by variation in length of signal lines from the 90-degree optical hybrid circuit 21 to the digital signal processor 25, variation in characteristics of the amplifiers 24a-24d, or the like.

The receiver 4 has a function of reducing the skew between I/Q as well as the transmitter 3. In the receiver 4, for example, the digital signal processor 25 reduces the skew between I/Q with digital signal processing.

The transmitter 3 illustrated in FIG. 2 and the receiver 4 illustrated in FIG. 3 adopt polarization multiplexing, but the optical transmission system according to the embodiments may adopt single polarization transmission. Also, the transmitter 3 illustrated in FIG. 2 and the receiver 4 illustrated in FIG. 3 adopt QPSK, but the optical transmission system according to the embodiments may transmit data by other modulation methods.

<First Aspect>

First Embodiment

FIG. 4 illustrates a relationship among skew, chromatic dispersion, and Q factor. In FIG. 4, the horizontal axis indicates a skew compensation amount provided in the receiver 4. The vertical axis indicates the Q factor. The Q factor indicates the quality of received signals. For example, Q factor is calculated based on the number of corrected errors counted by a FEC (forward error correction) circuit.

The graph illustrated in FIG. 4 is obtained by simulations under the following conditions. The difference between the frequency of the transmitter LD 11 and the frequency of the local LD 22 (i.e., frequency offset) is zero. The skew between I/Q generated in the transmitter 3 is +9 ps. The skew between I/Q generated in the receiver 4 is −9 ps. The line width of the transmitter LD 11 and the local LD 22 is 100 kHz. The optical signal-to-noise ratio (OSNR) is 15 dB. The skew between I/Q generated in the transmitter 3 is hereinafter referred to as "Tx skew", and the skew between I/Q generated in the receiver 4 is referred to as "Rx skew".

In the case where the chromatic dispersion of the optical transmission line between the transmitter 3 and the receiver 4 is zero in the simulations, the Q factor is optimized when the skew compensation amount in the receiver 4 is approximately zero. Here, sum of the Tx skew and the Rx skew is zero. When the chromatic dispersion is zero, the Q factor is optimized by compensating for the sum of the Tx skew and the Rx skew.

When the chromatic dispersion is 200 ps/nm, the Q factor is optimized by controlling the skew compensation amount in the receiver 4 to be approximately 5 ps. In other words, the skew compensation amount for optimizing the Q factor is shifted from the sum of the Tx skew and the Rx skew. It is considered that the shift is generated because an optical signal waveform is distorted by the chromatic dispersion and the Tx skew is not easily detected at the receiver. Hereinafter, the skew compensation amount in the receiver 4 for optimizing or substantially optimizing the Q factor is referred to as an "optimal skew compensation amount".

When the chromatic dispersion is 1000 ps/nm, the optimal skew compensation amount is further increased. In the example illustrated in FIG. 4, the Q factor is optimized when the skew compensation amount in the receiver 4 is controlled to be approximately 10 ps.

Figure 5A:
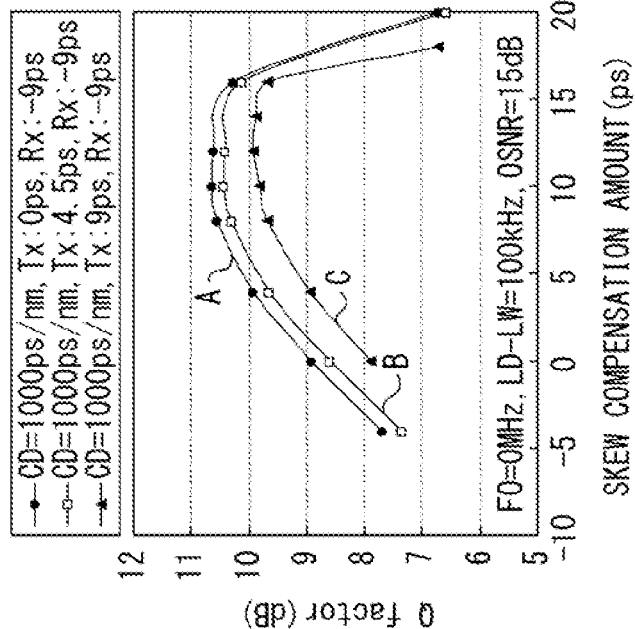
FIGS. 5A and 5B illustrate a relationship among Tx skew, Rx skew, and skew compensation amount.
Figure 5B:
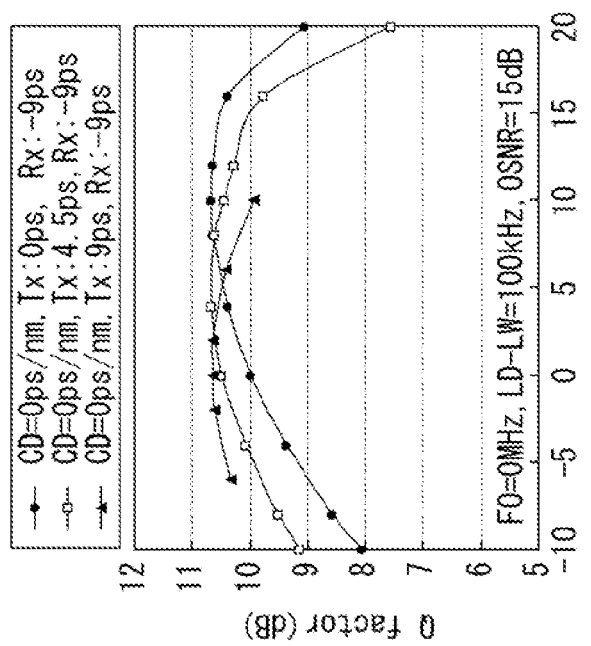

FIGS. 5A and 5B illustrate a relationship among Tx skew, Rx skew, and skew compensation amount. The simulation results illustrated in FIGS. 5A and 5B are obtained under the same conditions as illustrated in FIG. 4. In FIG. 5A, the Tx skew is changed under the condition that the chromatic dispersion is zero. In FIG. 5B, the Tx skew is changed under the condition that the chromatic dispersion is 1000 ps/nm. The Rx skew is constant (−9 ps) in FIGS. 5A and 5B.

When the chromatic dispersion is zero, the optimal skew compensation amount depends on the Tx skew as illustrated in FIG. 5A. More specifically, in the example illustrated in FIG. 5A, the optimal skew compensation amount is approximately 10 ps, 5 ps, and 0 ps when the Tx skew is 0 ps/nm, 4.5 ps/nm, and 9 ps/nm, respectively.

On the other hand, the optimal skew compensation amount does not substantially depend on the Tx skew when the chromatic dispersion is 1000 ps/nm as illustrated in FIG. 5B. When the Rx skew is constant, the optimal skew compensation amount is hardly changed when the Tx skew is changed. In the example illustrated in FIG. 5B, the optimal skew compensation amount is approximately 10 ps when the Tx skew is 0 ps/nm, 4.5 ps/nm, and 9 ps/nm.

When the chromatic dispersion is large, the optimal skew compensation amount hardly depends on the Tx skew and is substantially decided depending on the Rx skew. In other words, when the chromatic dispersion is large in the optical transmission system for transmitting the optical signal from the transmitter 3 to the receiver 4, the skew between I/Q generated in the receiver 4 can be detected and suppressed irrespective of the transmitter 3.

To suppress the Rx skew irrespective of the transmitter 3, the chromatic dispersion is controlled to be sufficiently large such that the optimal skew compensation amount is not substantially affected by the Tx skew. The "sufficiently large chromatic dispersion" may be specified by simulations or measurements. For example, it can be specified by searching the chromatic dispersion at which the optimal skew compensation amount is not changed while gradually increasing the chromatic dispersion. However, the "sufficiently large chromatic dispersion" depends on a sampling rate of the A/D converter provided with the receiver 4, and the like.

It is not preferable that the chromatic dispersion is increased too much because the Q factor is deteriorated. Thus, it is preferable that the "sufficiently large chromatic dispersion" is determined so that the optimal skew compensation amount is not affected by the Tx skew and the Q factor is not largely deteriorated. The "sufficiently large chromatic dispersion" may be a positive dispersion or negative dispersion.

As described above, the optimal skew compensation amount does not substantially depend on the Tx skew when the chromatic dispersion is large. However, the Q factor depends on the Tx skew even when the chromatic dispersion is large as illustrated in FIG. 5B. For example, compared to the Q factor (characteristic A) when the Tx skew is 0 ps, the Q factor (characteristic B) when the Tx skew is 4.5 ps is low. The Q factor (characteristic C) when the Tx skew is 9 ps is further reduced. In other words, the Q factor can be improved by suppressing the Tx skew in the transmitter 3.

Thus, a skew suppression method according to the first embodiment conducts the following controlling steps.
(1) sufficiently increasing the chromatic dispersion added to the optical signal;
(2) determining the optimal skew compensation amount while monitoring the Q factor to suppress the Rx skew; and
(3) suppressing the Tx skew while monitoring the Q factor.

The order of conducting the steps (2) and (3) is not particularly limited. The step (2) may be conducted prior to the step (3), or the step (3) may be conducted prior to the step (2). The steps (2) and (3) may be alternately conducted repeatedly. Alternatively, either one of the steps (2) and (3) may be conducted.

FIG. 6 illustrates a configuration of an optical transmission system for providing the skew suppression method according to the first embodiment. The optical transmission system according to the first embodiment includes the transmitter 3 illustrated in FIG. 2, the receiver 4 illustrated in FIG. 3, a chromatic dispersion adder 41, a controller 42.

The transmitter 3 and the receiver 4 correspond to, for example, the transmitter 3A and the receiver 4B illustrated in FIG. 1, respectively. The transmitter 3 and the receiver 4 may be one pair of a transmitter and a receiver provided in one optical transmission device (for example, the transmitter 3A and the receiver 4A). Alternatively, the transmitter 3 and the receiver 4 may be any transmitter and any receiver in inspection before shipment of products.

The transmitter 3 includes the transmitter LD 11, a modulator 12, and a Tx inter-channel delay controller 14. The modulator 12 is a DP-QPSK optical modulator including the optical modulators 12x and 12y illustrated in FIG. 2. The Tx inter-channel delay controller 14 includes the delay control elements 14a-14d illustrated in FIG. 2 to control a delay amount of each channel (XI, XQ, YI, YQ) in accordance with a command from the controller 42. The Tx inter-channel delay controller 14 may have a function of notifying the delay amount of each channel to the controller 42. The transmitter 3 may include the amplifiers 13a-13d illustrated in FIG. 2.

For example, the delay control elements 14a-14d are realized by digital filters. In this case, tap coefficients of each digital filter is determined in accordance with the command from the controller 42. The configuration and the operation of the digital filters realizing the delay control elements are described in, for example, Japanese Laid-Open Patent Publication No. 2010-193204. The delay control elements 14a-14d may be realized by phase shifters. In this case, a phase shift amount of each phase shifter is determined in accordance with the command from the controller 42. Also, the delay control elements 14a-14d may be realized by digital flip-flops. In this case, a read timing of each digital flip-flop is determined in accordance with the command from the controller 42. The Tx inter-channel delay controller 14 may control delay time on the digital signal or may control delay time on the analog signal.

The receiver 4 includes the 90-degree optical hybrid circuit 21, the local LD 22, the opto-electro converter 23, the A/D converter 31, and a Rx inter-channel delay controller 32, a chromatic dispersion compensator 33, and a signal quality detector 34. The opto-electro converter 23 includes the photo detectors 23a-23d illustrated in FIG. 3 to convert the optical signals (XI, XQ, YI, YQ) output from the 90-degree optical hybrid circuit 21 into electrical signals. The A/D converter 31 converts the signals (XI, XQ, YI, YQ) output from the opto-electro converter 23 into digital signals. The Rx inter-channel delay controller 32, the chromatic dispersion compensator 33, and the signal quality detector 34 are provided by the digital signal processor 25 illustrated in FIG. 3. Although not illustrated in FIG. 6, the receiver 4 has a function that demodulates input signal by digital signal processing and recovers transmission data. The receiver 4 may include the amplifiers 24a-24d illustrated in FIG. 3.

The Rx inter-channel delay controller 32 is realized by providing a digital filter for each channel (XI, XQ, YI, YQ). In this case, tap coefficients of each digital filter is determined in accordance with a command from the controller 42. The configuration and the operation of the digital filters realizing the Rx inter-channel delay controller 32 are described in, for example, Japanese Laid-Open Patent Publication No. 2010-193204. The Rx inter-channel delay controller 32 may be disposed on an input side of the digital signal processor 25. The Rx inter-channel delay controller 32 may be realized by a phase shifter that shifts a phase of an analog signal of each channel (XI, XQ, YI, YQ). In this case, a phase shift amount of each phase shifter is determined in accordance with the command from the controller 42. The Rx inter-channel delay controller 32 may control a delay time on a digital signal or may control a delay time on an analog signal.

The chromatic dispersion compensator 33 compensates for (or suppress) chromatic dispersion added to an input optical signal by digital signal processing. At this time, the chromatic dispersion compensator 33 compensates for chromatic dispersion added by the optical transmission line between the transmitter 3 and the receiver 4 and the chromatic dispersion added by the chromatic dispersion adder 41. Also, the chromatic dispersion compensator 33 can detect an amount of chromatic dispersion added to the input optical signal and notify the detected amount to the controller 42.

The signal quality detector 34 monitors the quality of a received signal by digital signal processing and calculates a Q factor based on the monitoring results. The Q factor indicates the quality of the received signal. For example, the Q factor is calculated based on the number of corrected errors counted by the FEC circuit. Note that the Q factor may be calculated based on other parameters.

The chromatic dispersion adder 41 is disposed between the transmitter 3 and the receiver 4 to add chromatic dispersion to an optical signal transmitted from the transmitter 3. The chromatic dispersion adder 41 may be disposed in the vicinity of the transmitter 3, or may be disposed in the vicinity of the receiver 4. An amount of chromatic dispersion added to the optical signal by the chromatic dispersion adder 41 is determined by the controller 42.

For example, the chromatic dispersion adder 41 is realized by an optical fiber. In this case, an optical fiber having sufficiently large chromatic dispersion can be used as the chromatic dispersion adder 41. The chromatic dispersion adder 41 may include a plurality of optical fibers having different chromatic dispersion amounts and a switch for selecting either one of the optical fibers. With such a configuration, the chromatic dispersion adder 41 selects one optical fiber having a chromatic dispersion amount indicated by the controller 42.

The chromatic dispersion adder 41 may be realized by other configurations. For example, the chromatic dispersion adder 41 may be realized by a VIPA (virtually imaged phased array). Alternatively, the chromatic dispersion adder 41 may be realized by a fiber bragg grating.

The controller 42 controls the chromatic dispersion amount of the chromatic dispersion adder 41 in accordance with the chromatic dispersion amount detected by the chromatic dispersion compensator 33. In addition, the controller 42 controls the skew suppression in the Tx inter-channel delay controller 14 and/or the Rx inter-channel delay controller 32 based on the Q factor obtained by the signal quality detector 34.

For example, the controller 42 includes a processor and memory. The memory may include ROM area and RAM area. By executing a skew suppression program stored in the memory, the processor controls the chromatic dispersion adder 41, the Tx inter-channel delay controller 14, and the Rx inter-channel delay controller 32.

Figure 7:
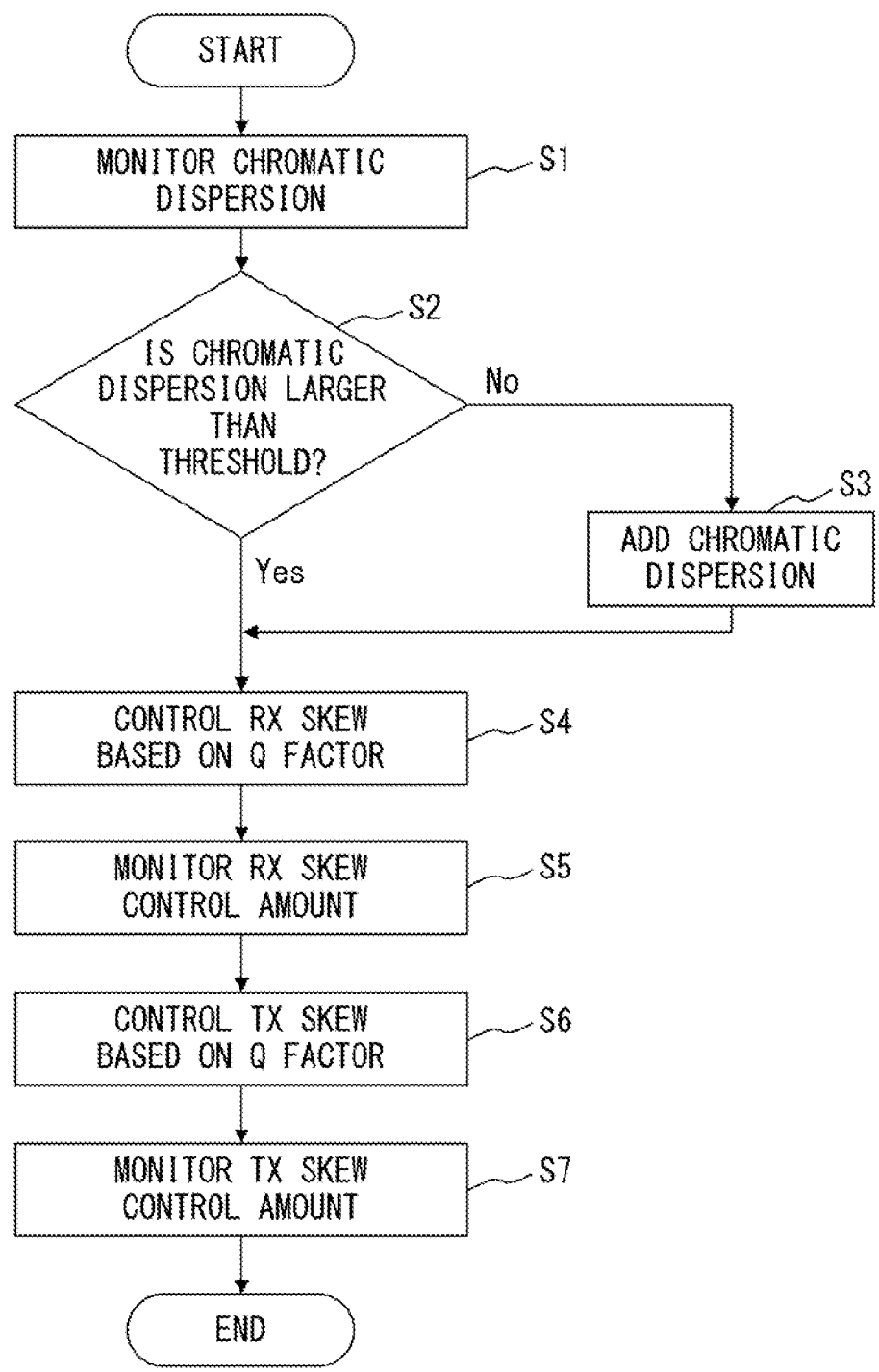
FIG. 7 is a flowchart illustrating the skew suppression method according to the first embodiment.

FIG. 7 is a flowchart illustrating the skew suppression method according to the first embodiment. The processing illustrated in the flowchart is executed by the controller 42, for example, in a calibration process, in an initial setting, or before shipment of the transmitter 3 and the receiver 4. At this time, the controller 42 executes the processing illustrated in the flow chart in FIG. 7 using the chromatic dispersion adder 41, the Tx inter-channel delay controller 14, and the Rx inter-channel delay controller 32.

In S1, the controller 42 monitors an amount of chromatic dispersion added to an optical signal input to the receiver 4. The amount of chromatic dispersion added to the input optical signal is detected by the chromatic dispersion compensator 33 and is notified to the controller 42.

In S2, the controller 42 determines whether or not the amount of chromatic dispersion added to the input optical signal is larger than a specified threshold. As described above with reference to FIG. 5B, the threshold corresponds to the chromatic dispersion at which the optimal skew compensation amount does not substantially depend on the Tx skew.

When the amount of chromatic dispersion added to the input optical signal is smaller than or equal to the threshold, the controller 42 controls the chromatic dispersion adder 41 in S3 so that the amount of chromatic dispersion is larger than the threshold. Accordingly, the chromatic dispersion adder 41 adds chromatic dispersion, which is indicated by the controller 42, to the optical signal transmitted from the transmitter 3 to the receiver 4. Consequently, the amount of chromatic dispersion added to the input optical signal becomes larger than the threshold. When the amount of chromatic dispersion added to the input optical signal is larger than the threshold, S3 is skipped.

It is not required that the processing in S3 is always executed automatically. For example, the processing in S3 may be realized by inserting an optical fiber having a specified chromatic dispersion as the chromatic dispersion adder 41 between the transmitter 3 and the receiver 4.

In S4, the controller 42 determines an optimal skew compensation amount based on the Q factor of the input optical signal. Here, the Q factor is detected by the signal quality detector 34 and is notified to the controller 42. Since the amount of chromatic dispersion added to the input optical signal is larger than the threshold, the optimal skew compensation amount does not substantially depend on the Tx skew. The optimal skew compensation amount substantially depends only on the Rx skew. Thus, the controller 42 controls the Rx inter-channel delay controller 32 using the optimal skew compensation amount determined based on the Q factor.

The Rx inter-channel delay controller 32 controls a delay amount of a corresponding channel in accordance with a command from the controller 42. For example, when the optimal skew compensation amount is +10 ps, the Rx inter-channel delay controller 32 increases the delay amount of the I-channel by 10 ps. Alternatively, the Rx inter-channel delay controller 32 may reduce the delay amount of the Q-channel by 10 ps. Also, the Rx inter-channel delay controller 32 may increase the delay amount of the I-channel by 5 ps and reduce the delay amount of the Q-channel by 5 ps.

Similarly, when the optimal skew compensation amount is −10 ps, the Rx inter-channel delay controller 32 increases the delay amount of the Q-channel by 10 ps. Alternatively, the Rx inter-channel delay controller 32 may reduce the delay amount of the I-channel by 10 ps. Also, the Rx inter-channel delay controller 32 may increase the delay amount of the Q-channel by 5 ps and reduce the delay amount of the I-channel by 5 ps.

The controller 42 can detect and suppress the skew for each polarization. At this time, the skew between the XI and XQ channels is detected and reduced and the skew between the YI and YQ channels is detected and reduced. Also, a step of minimizing a difference between an average value of a delay time of a X polarized signal and an average value of a delay time of a Y polarized signal (skew between X-Y) may be added to the skew suppression method according to the embodiments.

In S5, the controller 42 monitors an amount of the skew controlled by the Rx inter-channel delay controller 32. When it is confirmed that the operation of the Rx inter-channel delay controller 32 is normal, S6 and S7 are executed.

In S6, the controller 42 determines a skew compensation amount for reducing the Tx skew based on the Q factor of the input optical signal. Then, the controller 42 controls the Tx inter-channel delay controller 14 using the skew compensation amount determined based on the Q factor. The Tx inter-channel delay controller 14 controls a delay amount of a corresponding channel in accordance with a command from the controller 42. At this time, the Tx inter-channel delay controller 14 controls the delay amount of at least one of the I-channel and the Q-channel.

The operation in S6 corresponds to the processing of sweeping the skew compensation amount in the transmitter 3 and searching the optimal characteristic A in the example illustrated in FIG. 5B. For example, the characteristic C is detected when the Tx skew is 9 ps. Then, the controller 42 specifies a skew compensation amount at which the Q factor is optimized by sweeping the skew compensation amount in the transmitter 3. In the example illustrated in FIG. 5B, it is considered that −9 ps is obtained as the skew compensation amount in the transmitter 3. Then, the controller 42 controls the Tx inter-channel delay controller 14 with the skew compensation amount, and the Tx inter-channel delay controller 14 controls the delay amount of the corresponding channel. Consequently, the skew of the transmitter 3 is reduced and the Q factor is improved.

In S7, the controller 42 monitors an amount of the skew controlled by the Tx inter-channel delay controller 14. When it is confirmed that the operation of the Tx inter-channel delay controller 14 is normal, the processing according to the skew suppression method is terminated.

The skew of the receiver 4 is suppressed in S4 and the skew of the transmitter 3 is suppressed in S6 in the skew suppression method according to the first embodiment. In other words, the skew of the transmitter 3 and the skew of the receiver 4 are suppressed independently.

The order of executing the steps is not limited to that illustrated in FIG. 7. S6 and S7 may be executed prior to S4 and S5. Also, S4 and S5, and S6 and S7 may be alternately executed repeatedly. Alternatively, either one of S4 and S5, and S6 and S7 may be executed.

As described above, the skew of the transmitter 3 and the skew of the receiver 4 can be suppressed independently in the skew suppression method according to the first embodiment. Thus, the quality of signals is improved. Also, a system for controlling and evaluating the skew is simplified and/or its speed is increased. Since the skew of the transmitter and the skew of the receiver are separately suppressed, the quality of the optical transmission system is maintained even when the combination of the transmitter and receiver is changed.

Figure 8:
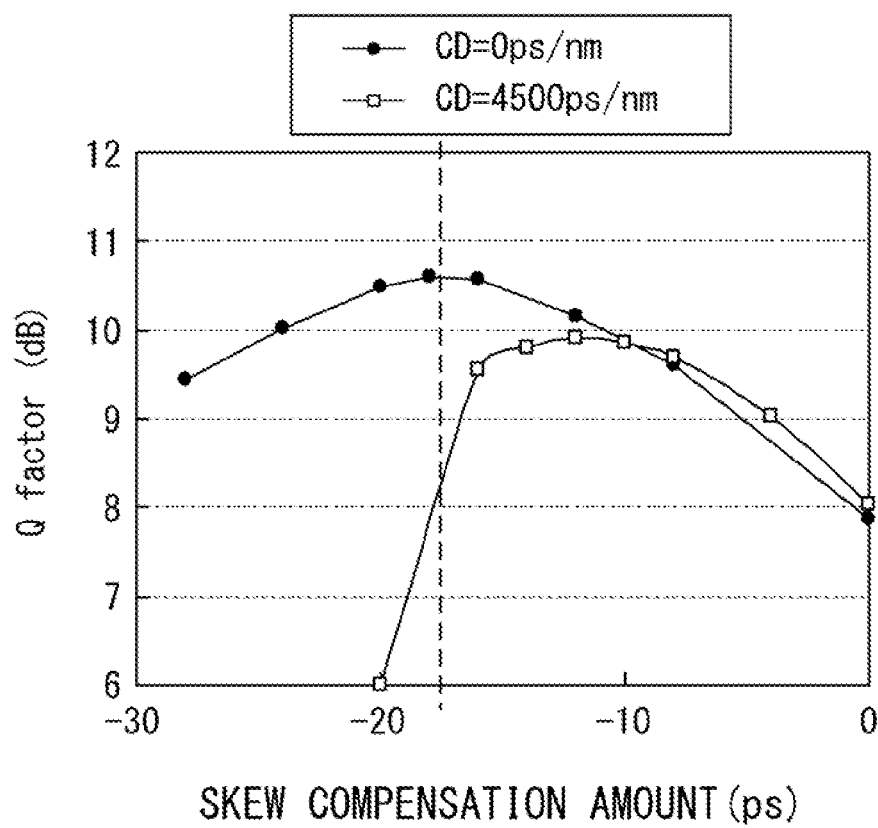
FIG. 8 illustrates an effect of the skew suppression method according to the first embodiment.

With respect to the quality of signals, the deterioration of transmission can be avoided or suppressed as follows. For example, the skew between the XI and XQ channels in the transmitter 3 is 9 ps, the skew between the XI and XQ channels in the receiver 4 is 9 ps, the frequency offset of the transmitter LD 11 and the local LD 22 is zero, and the line width of the transmitter LD 11 and the local LD 22 is 100 kHz. When the chromatic dispersion is 0 ps/nm, the correlation of the Tx skew and the Rx skew is high and therefore the optimal skew compensation amount is approximately −18 ps as illustrated in FIG. 8. On the other hand, when the chromatic dispersion is large (4500 ps/nm in FIG. 8), the correlation of the Tx skew and the Rx skew is low. Thus, a large penalty is generated when the skew compensation is executed under the same conditions. In the example illustrated in FIG. 8, the Q factor is approximately 8 dB when the skew compensation is executed at −18 ps in the receiver 4.

In the skew suppression method according to the first embodiment, the skew compensation is executed at approximately −10 ps in the receiver 4 as illustrated in FIG. 8. At this time, the Q factor is approximately 10 dB. In other words, the chromatic dispersion penalty caused by the variation of the skew compensation amount is reduced in the method according to the first embodiment.

Second Embodiment

Figure 9:
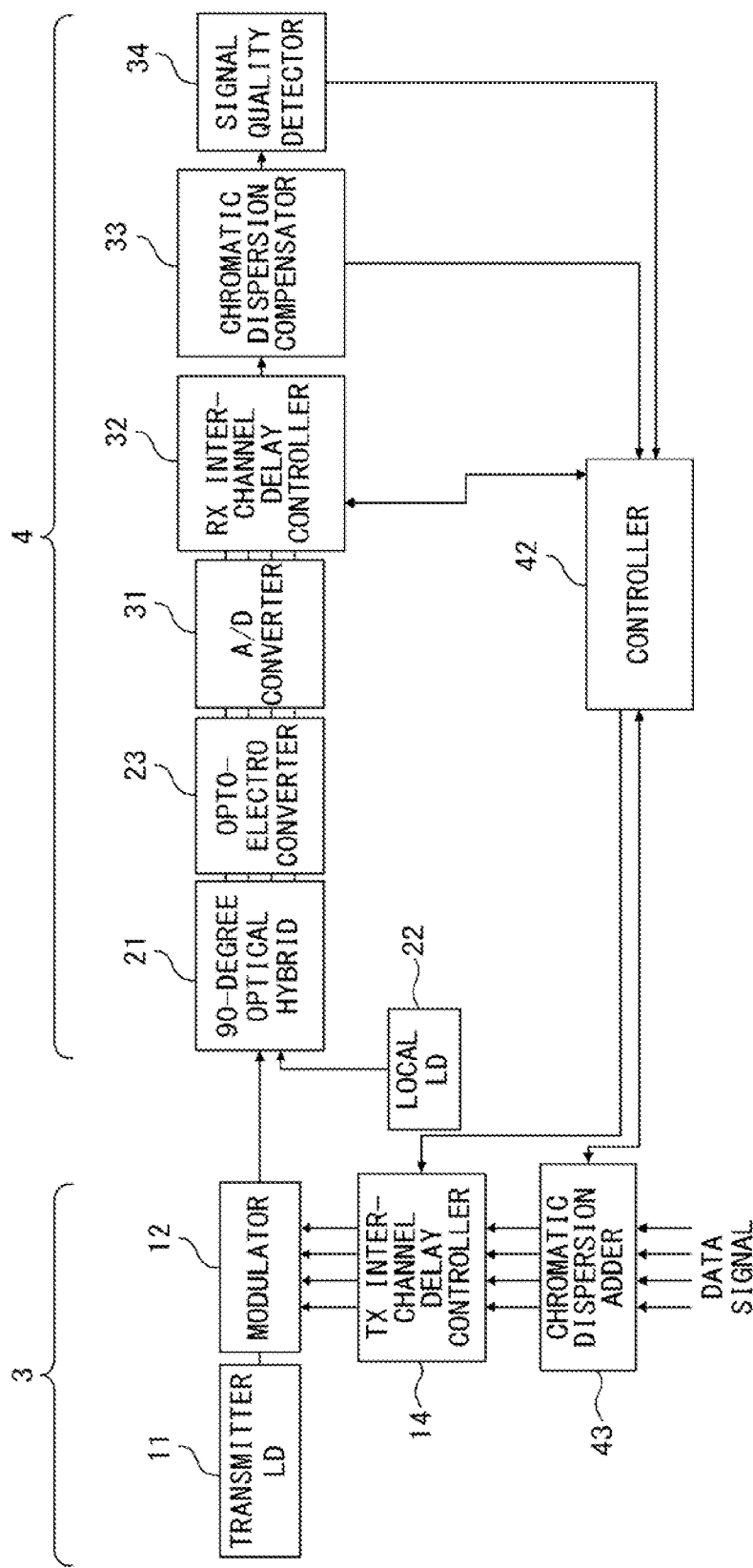
FIG. 9 illustrates a configuration of an optical transmission system for providing a skew suppression method according to a second embodiment.

FIG. 9 illustrates a configuration of an optical transmission system for providing a skew suppression method according to a second embodiment. The optical transmission system according to the second embodiment includes the transmitter 3 illustrated in FIG. 2, the receiver 4 illustrated in FIG. 3, the controller 42, and a chromatic dispersion adder 43. Compared to the first embodiment, the optical transmission system according to the second embodiment is provided with the chromatic dispersion adder 43 instead of the chromatic dispersion adder 41.

The chromatic dispersion adder 41 optically adds chromatic dispersion to an optical signal. On the other hand, the chromatic dispersion adder 43 electrically adds chromatic dispersion to a data signal for generating an optical signal.

The chromatic dispersion adder 43 is realized by, for example, a digital filter. When a bit rate of the data signal and a modulation scheme are known in advance, distortion of an optical signal waveform corresponding to given chromatic dispersion can be calculated by simulations or measurements. When an amount of chromatic dispersion to be added to the optical signal is determined by the controller 42, the chromatic dispersion adder 43 distorts the waveform of the input data signal so as to have the amount of chromatic dispersion. In other words, the chromatic dispersion adder 43 gives distortion equivalent to necessary chromatic dispersion to the data signal. At this time, the chromatic dispersion adder 43 controls tap coefficients of the digital filter to provide the chromatic dispersion amount. Then, by generating an optical signal with the data signal, the optical signal to which the chromatic dispersion calculated by the controller 42 is added is output.

The procedure of the skew suppression method according to the second embodiment is similar to that illustrated in the flowchart in FIG. 7. However, in the second embodiment, the chromatic dispersion adder 43 electrically adds the chromatic dispersion to the data signal for generating the optical signal in S3 of FIG. 7. Consequently, the effects which are substantially the same as those in the first embodiment are obtained in the skew suppression method according to the second embodiment.

Third Embodiment

In the first and second embodiments, the Tx skew and the Rx skew are independently suppressed by sufficiently increasing the chromatic dispersion added to the optical signal. On the other hand, in a third embodiment, the Tx skew and the Rx skew are independently suppressed by sufficiently increasing a differential group delay (DGD) added to the optical signal. DGD is generated by polarization mode dispersion.

FIG. 10 illustrates simulation results of skew, polarization mode dispersion, and Q factor. The simulations are conducted under substantially the same conditions as in FIG. 4. In the simulations illustrated in FIG. 10, the Tx skew is +9 ps and the Rx skew is also +9 ps. In addition, in the simulations illustrated in FIG. 10, a relationship between a skew compensation amount and Q factor while the DGD of the polarization mode dispersion is changed is calculated.

In the case where the DGD of the optical transmission line between the transmitter 3 and the receiver 4 is zero in the simulations, the Q factor is optimized when the skew compensation amount in the receiver 4 is approximately −18 ps. Here, a sum of the Tx skew and the Rx skew is 18 ps. That is to say, when the DGD is zero, the Q factor is optimized by compensating for the sum of the Tx skew and the Rx skew.

When the DGD is 11 ps, the Q factor is optimized when the skew compensation amount is approximately −14 ps. In other words, the skew compensation amount for optimizing the Q factor is shifted from the sum of the Tx skew and the Rx skew. It is considered that the shift is generated because an optical signal waveform is distorted by the polarization mode dispersion and the Tx skew is not easily detected at the receiver.

When the DGD is 22 ps, the Q factor is optimized when the skew compensation amount is controller to be approximately −9 ps.

Figure 11B:
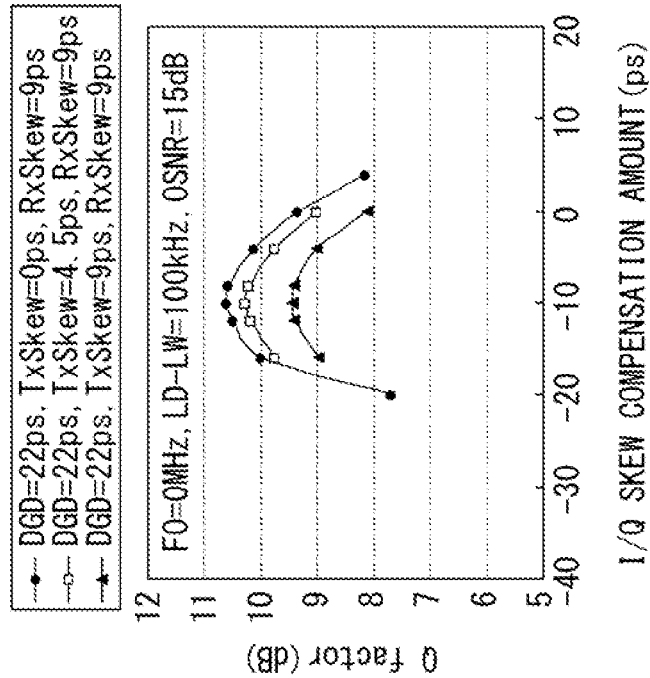
FIGS. 11A and 11B illustrate a relationship among Tx skew, Rx skew, and skew compensation amount with respect to the polarization mode dispersion.
Figure 11A:
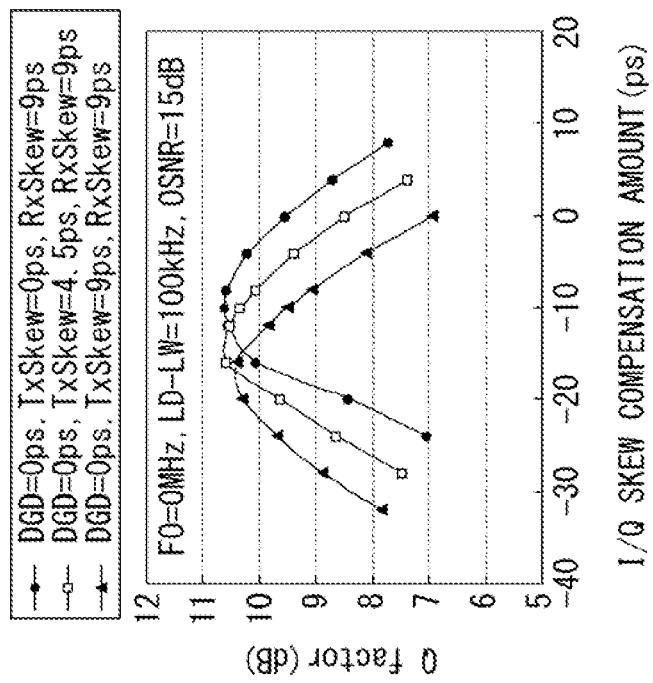

FIGS. 11A and 11B illustrate a relationship among Tx skew, Rx skew, and skew compensation amount with respect to polarization mode dispersion. In FIG. 11A, the Tx skew is changed in a case where the DGD is 0 ps. In FIG. 11B, the Tx skew is changed in a case where the DGD is 22 ps. In addition, the Rx skew is constant (9 ps) in FIGS. 11A and 11B.

The optimal skew compensation amount depends on the Tx skew when the DGD is 0 ps as illustrated in FIG. 11A. More specifically, the optimal skew compensation amount is approximately −9 ps, −14 ps, and −18 ps when the Tx skew is 0 ps/nm, 4.5 ps/nm, and 9 ps/nm, respectively.

The optimal skew compensation amount does not substantially depend on the Tx skew when the DGD is 22 ps as illustrated in FIG. 11B. When the Rx skew is constant, the optimal skew compensation amount is hardly changed when the Tx skew is changed. In the example illustrated in FIG. 11B, the optimal skew compensation amount is approximately −10 ps when the Tx skew is 0 ps/nm, 4.5 ps/nm, and 9 ps/nm.

As described above, when the DGD of the polarization mode dispersion is large, the optimal skew compensation amount hardly depends on the Tx skew and is substantially decided depending on the Rx skew. When the DGD is large in the optical transmission system for transmitting the optical signal from the transmitter 3 to the receiver 4, the skew between I/Q generated in the receiver 4 can be detected and suppressed irrespective of the transmitter 3.

To suppress the Rx skew irrespective of the transmitter 3, the DGD is controller to be sufficiently large such that the optimal skew compensation amount is not substantially affected by the Tx skew. The "sufficiently large DGD" is specified by, for example, simulations or measurements. For example, it is specified by gradually increasing the DGD and searching the DGD at which the optimal skew compensation amount is not changed.

It is not preferable that the polarization mode dispersion is increased too much because the Q factor is deteriorated. Thus, it is preferable that the "sufficiently large DGD" is determined so that the optimal skew compensation amount is not affected by the Tx skew and the Q factor is not largely deteriorated. The "sufficiently large DGD" may be a positive value or negative value.

As described above, the optimal skew compensation amount does not substantially depend on the Tx skew when the DGD is large. However, as illustrated in FIG. 11B, the Q factor depends on the Tx skew when the DGD is large. In other words, the Q factor can be improved by suppressing the Tx skew in the transmitter 3.

In the third embodiment, by giving the sufficiently large DGD to the optical signal, the Tx skew and the Rx skew can be suppressed independently as described above. Thus, the skew suppression method according to the third embodiment conducts the following controlling steps.

(1) sufficiently increasing the DGD added to the optical signal;
(2) determining the optimal skew compensation amount while monitoring the Q factor to suppress the Rx skew; and
(3) suppressing the Tx skew while monitoring the Q factor.

Figure 12:
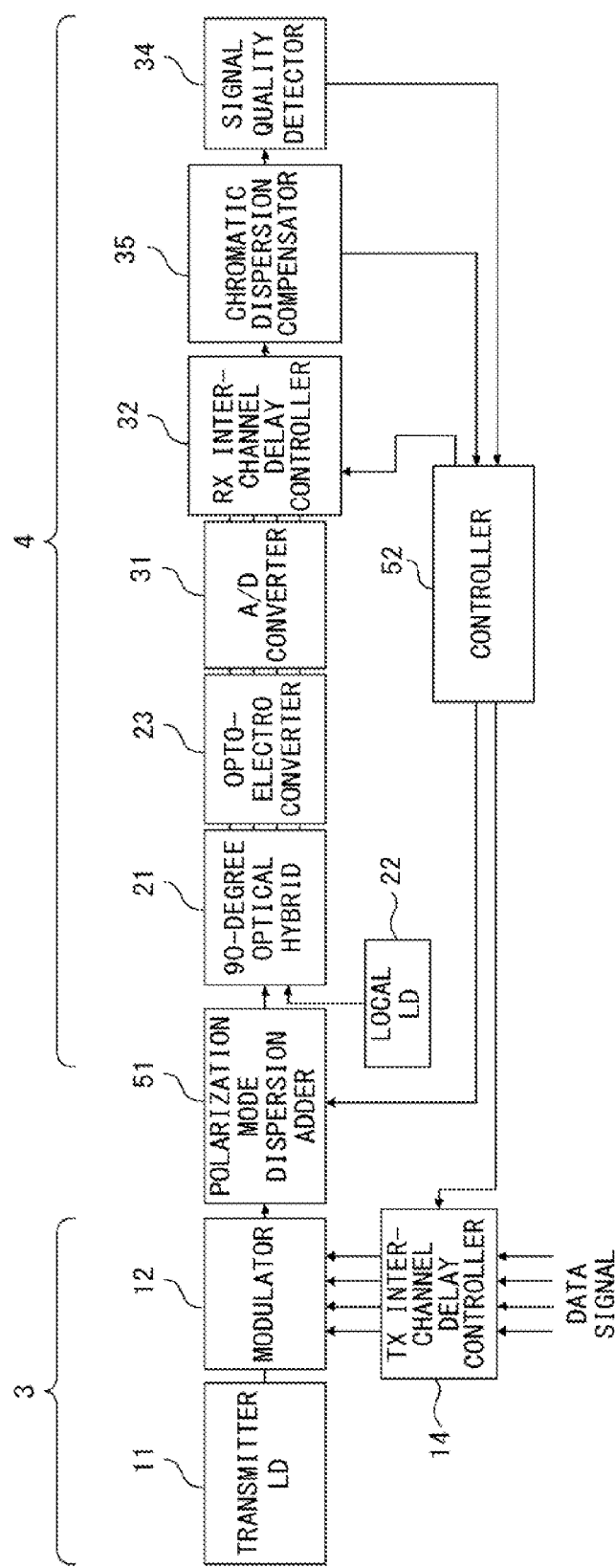
FIG. 12 illustrates a configuration of an optical transmission system for providing a skew suppression method according to a third embodiment.

FIG. 12 illustrates a configuration of the optical transmission system for providing the skew suppression method according to the third embodiment. The optical transmission system according to the third embodiment includes the transmitter 3 illustrated in FIG. 2, the receiver 4 illustrated in FIG. 3, a polarization mode dispersion adder 51, and a controller 52. Compared with the first embodiment, the optical transmission system according to the third embodiment is provided with the polarization mode dispersion adder 51 and the controller 52 instead of the chromatic dispersion adder 41 and the controller 42.

The transmitter 3 includes the transmitter LD 11, the modulator 12, and the Tx inter-channel delay controller 14 as in the first embodiment. Thus, an explanation of the transmitter is omitted here. However, the Tx inter-channel delay controller 14 controls a delay amount of each channel (XI, XQ, YI, YQ) in accordance with a command from the controller 52.

The receiver 4 includes the 90-degree optical hybrid circuit 21, the local LD 22, the opto-electro converter 23, the A/D converter 31, the Rx inter-channel delay controller 32, a polarization mode dispersion compensator 35, and the signal quality detector 34. An explanation of the 90-degree optical hybrid circuit 21, the local LD 22, the opto-electro converter 23, the A/D converter 31, the Rx inter-channel delay controller 32, and the signal quality detector 34 is omitted here. However, the Rx inter-channel delay controller 32 controls a delay amount of each channel (XI, XQ, YI, YQ) in accordance with a command from the controller 52.

The polarization mode dispersion compensator 35 compensates for polarization mode dispersion added to an input optical signal by digital signal processing. At this time, the polarization mode dispersion compensator 35 compensates for the polarization mode dispersion added by the optical transmission line between the transmitter 3 and the receiver 4 and the polarization mode dispersion added by the polarization mode dispersion adder 51. Also, the polarized dispersion compensator 35 can detect an amount of polarization mode dispersion (i.e., DGD) added to the input optical signal and notify the detected amount to the controller 52.

The polarization mode dispersion adder 51 is realized by, for example, a polarization-maintaining optical fiber. For example, a PANDA (polarization-maintaining and absorption reducing) fiber may be used. A polarization-maintaining optical fiber having a sufficiently large polarization mode dispersion can be used as the polarization mode dispersion adder 51. The PANDA fiber may be added at the output side of a polarization scrambler. Alternatively, the polarization mode dispersion adder 51 may include a plurality of polarization-maintaining optical fibers having different DGDs and a switch for selecting either one of the polarization-maintaining optical fibers. With such a configuration, the polarization mode dispersion adder 51 selects a polarization-maintaining optical fiber having a DGD indicated by the controller 52.

The polarization mode dispersion adder 51 may be realized by other configurations. For example, as the polarization mode dispersion adder 51, a polarization mode dispersion adding device that can separate an optical signal to a pair of polarizations orthogonal to each other and add desired delay to each of the polarizations.

The procedure of the skew suppression method according to the third embodiment is similar to that illustrated by the flowchart in FIG. 7. In the third embodiment, however, the DGD of the polarization mode dispersion is detected instead of S1 and S2 in FIG. 7. When the DGD is smaller than or equal to a specified threshold, the controller 52 controls the polarization mode dispersion adder 51 so that the DGD is larger than the threshold instead of S3. By so doing, the polarization mode dispersion adder 51 adds the DGD indicated by the controller 52 to the optical signal transmitted from the transmitter 3 to the receiver 4. Consequently, the DGD added to the input optical signal becomes larger than the threshold. As described above with reference to FIG. 11B, the threshold corresponds to the DGD at which the optimal skew compensation amount does not substantially depend on the Tx skew. The effects which are substantially the same as those in the first embodiment are obtained in the skew suppression method according to the third embodiment.

Fourth Embodiment

FIG. 13 illustrates a configuration of an optical transmission system for providing a skew suppression method according to a fourth embodiment. The optical transmission system according to the fourth embodiment includes the transmitter 3 illustrated in FIG. 2, the receiver 4 illustrated in FIG. 3, the controller 52, and a polarization mode dispersion adder 53. Compared to the third embodiment, the optical transmission system according to the fourth embodiment is provided with the polarization mode dispersion adder 53 instead of the polarization mode dispersion adder 51.

The polarization mode dispersion adder 51 optically adds polarization mode dispersion to an optical signal. On the other hand, the polarization mode dispersion adder 53 electrically adds polarization mode dispersion to a data signal for generating an optical signal.

The polarization mode dispersion adder 53 is realized by, for example, a digital filter. When a bit rate of the data signal and a modulation scheme are known in advance, distortion of an optical signal waveform corresponding to given polarization mode dispersion can be calculated by simulations or measurements. When a DGD to be added to the optical signal is determined by the controller 52, the polarization mode dispersion adder 53 distorts a waveform of the data signal for providing such a DGD. At this time, the polarization mode dispersion adder 53 controls tap coefficients of the digital filter to provide the DGD. Then, by generating the optical signal using the data signal, the optical signal to which the polarization mode dispersion calculated by the controller 52 is added is output.

The procedure of the skew suppression method according to the fourth embodiment is similar to that according to the third embodiment. However, in the fourth embodiment, the polarization mode dispersion adder 53 electrically adds polarization mode dispersion to the data signal for generating the optical signal. The effects which are substantially the same as those in the first embodiment are obtained in the skew suppression method according to the fourth embodiment.

<Second Aspect>

According to the first aspect, large dispersion (for example, chromatic dispersion, polarization mode dispersion) is added to the optical signal to suppress the Tx skew and the Rx skew independently. On the other hand, according to the second aspect, an optical frequency offset between the transmission LD and the local LD is controlled to suppress the Tx skew and the Rx skew independently.

FIG. 14 illustrates a relationship among skew, frequency offset, and Q factor. In FIG. 14, the horizontal axis indicates a skew compensation amount in the receiver 4. The vertical axis indicates the Q factor. The optical frequency offset denoted by FO indicates a difference between the oscillation frequency of the transmitter LD 11 and the oscillation frequency of the local LD 22.

The graph illustrated in FIG. 14 is obtained by simulations under the following conditions. The chromatic dispersion of the optical transmission line between the transmitter 3 and the receiver 4 is zero. The skew between I/Q (i.e., Tx skew) generated in the transmitter 3 is +9 ps. The skew between I/Q (i.e., Rx skew) generated in the receiver 4 is +9 ps. The line width of the transmitter LD 11 and the local LD 22 is 100 kHz. The optical signal-to-noise ratio (OSNR) is 15 dB.

In the case where the optical frequency offset is zero in the simulations, the Q factor is optimized when the skew compensation amount in the receiver 4 is approximately −18 ps. Here, a sum of the Tx skew and the Rx skew is 18 ps. In other words, when the optical frequency offset is zero, the Q factor is optimized by compensating for the sum of the Tx skew and the Rx skew.

When the optical frequency offset is 27 MHz, 54 MHz, and 108 MHz, the optimal skew compensation amount is approximately −10 ps. In other words, the optimal skew compensation amount is shifted from the sum of the Tx skew and the Rx skew. It is considered that the shift is generated because a phase of the received signal is rotated by the optical frequency offset and the Tx skew is not easily detected at the receiver.

Figure 15A:
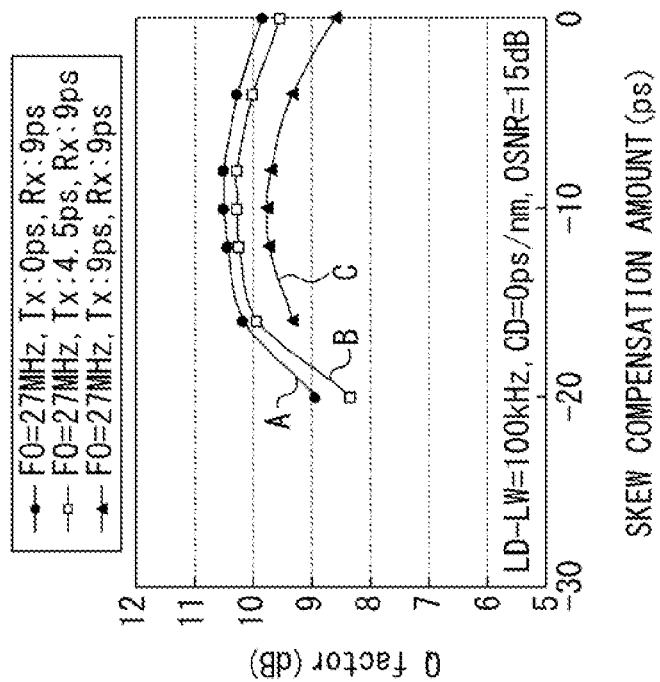
FIGS. 15A and 15B illustrate a relationship among Tx skew, Rx skew, and skew compensation amount with respect to the frequency offset.
Figure 15B:
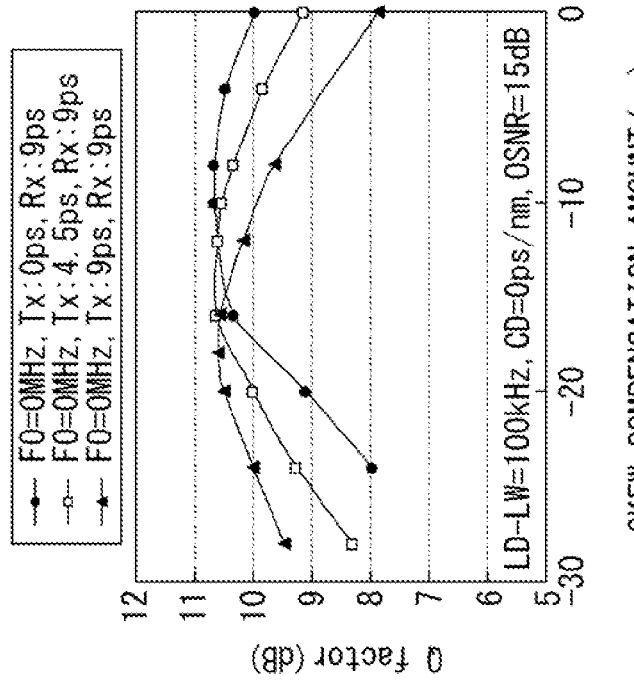

FIGS. 15A and 15B illustrate a relationship among Tx skew, Rx skew, and skew compensation amount with respect to a frequency offset. The simulation results illustrated in FIGS. 15A and 15B are obtained under substantially the same conditions as illustrated in FIG. 14. However, in FIG. 15A, the Tx skew is changed while the optical frequency offset is 0 Hz. In FIG. 15B, the Tx skew is changed while the optical frequency offset is 27 MHz. In addition, the Rx skew is constant (9 ps) in FIGS. 15A and 15B.

When the optical frequency offset is 0 Hz, the optimal skew compensation amount depends on the Tx skew as illustrated in FIG. 15A. More specifically, the optimal skew compensation amount is approximately −9 ps, −14 ps, and −18 ps when the Tx skew is 0 ps/nm, 4.5 ps/nm, and 9 ps/nm, respectively.

On the other hand, the optimal skew compensation amount does not substantially depend on the Tx skew when the optimal frequency offset is 27 ps as illustrated in FIG. 15B. That is to say, while the Rx skew is constant, the optimal skew compensation amount is hardly changed when the Tx skew is changed. In the example illustrated in FIG. 15B, the optimal skew compensation amount is approximately −9 ps when the Tx skew is 0 ps/nm, 4.5 ps/nm, and 9 ps/nm.

When the optimal frequency offset is large, the optimal skew compensation amount hardly depends on the Tx skew and is substantially decided depending on the Rx skew. When the optical frequency offset is large in the optical transmission system for transmitting the optical signal from the transmitter 3 to the receiver 4, the skew between I/Q generated in the receiver 4 can be detected and suppressed irrespective of the transmitter 3.

To suppress the Rx skew irrespective of the transmitter 3, the optical frequency offset is controlled to be sufficiently large such that the optimal skew compensation amount is not substantially affected by the Tx skew. The "sufficiently large optical frequency offset" is specified by, for example, simulations or measurements. For example, as illustrated in FIG. 14, it is specified by gradually increasing the optical frequency offset and searching the optimal frequency offset at which the optimal skew compensation amount is not changed. Note that the "sufficiently large optical frequency offset" also depends on a sampling rate of the A/D converter provided with the receiver 4 and the maximum value of the Tx skew.

However, it is not preferable that the optical frequency offset is increased too much because the Q factor is deteriorated. Thus, it is preferable that the "sufficiently large optical frequency offset" is determined so that the optimal skew compensation amount is not affected by the Tx skew and the Q factor is not largely deteriorated. For providing the "sufficiently large optical frequency offset", the optical frequency of the carrier light may be higher than the optical frequency of the local light, or the optical frequency of the carrier light may be lower than the optical frequency of the local light.

As described above, the optimal skew compensation amount does not substantially depend on the Tx skew when the optical frequency offset is large. However, the Q factor depends on the Tx skew when the optical frequency offset is large as illustrated in FIG. 15B. For example, compared to the Q factor (characteristic A) when the Tx skew is 0 ps, the Q factor (characteristic B) when the Tx skew is 4.5 ps is low. The Q factor (characteristic C) when the Tx skew is 9 ps is further reduced. In other words, the Q factor is improved by suppressing the Tx skew in the transmitter 3.

According to the second aspect, the Tx skew and the Rx skew can be suppressed independently by sufficiently increasing the optical frequency offset. Thus, the skew suppression method according to the second aspect conducts the following controlling steps.
(1) sufficiently increasing the optical frequency offset;
(2) determining the optimal skew compensation amount while monitoring the Q factor to suppress the Rx skew; and
(3) suppressing the Tx skew while monitoring the Q factor.

The order of conducting the steps (2) and (3) is not particularly limited. The step (2) may be conducted prior to the step (3), or the step (3) may be conducted prior to the step (2). The steps (2) and (3) may be alternately conducted repeatedly. Alternatively, either one of the steps (2) and (3) may be conducted. Fifth to 13th embodiments according to the second aspect will be explained below.

Fifth Embodiment

Figure 16:
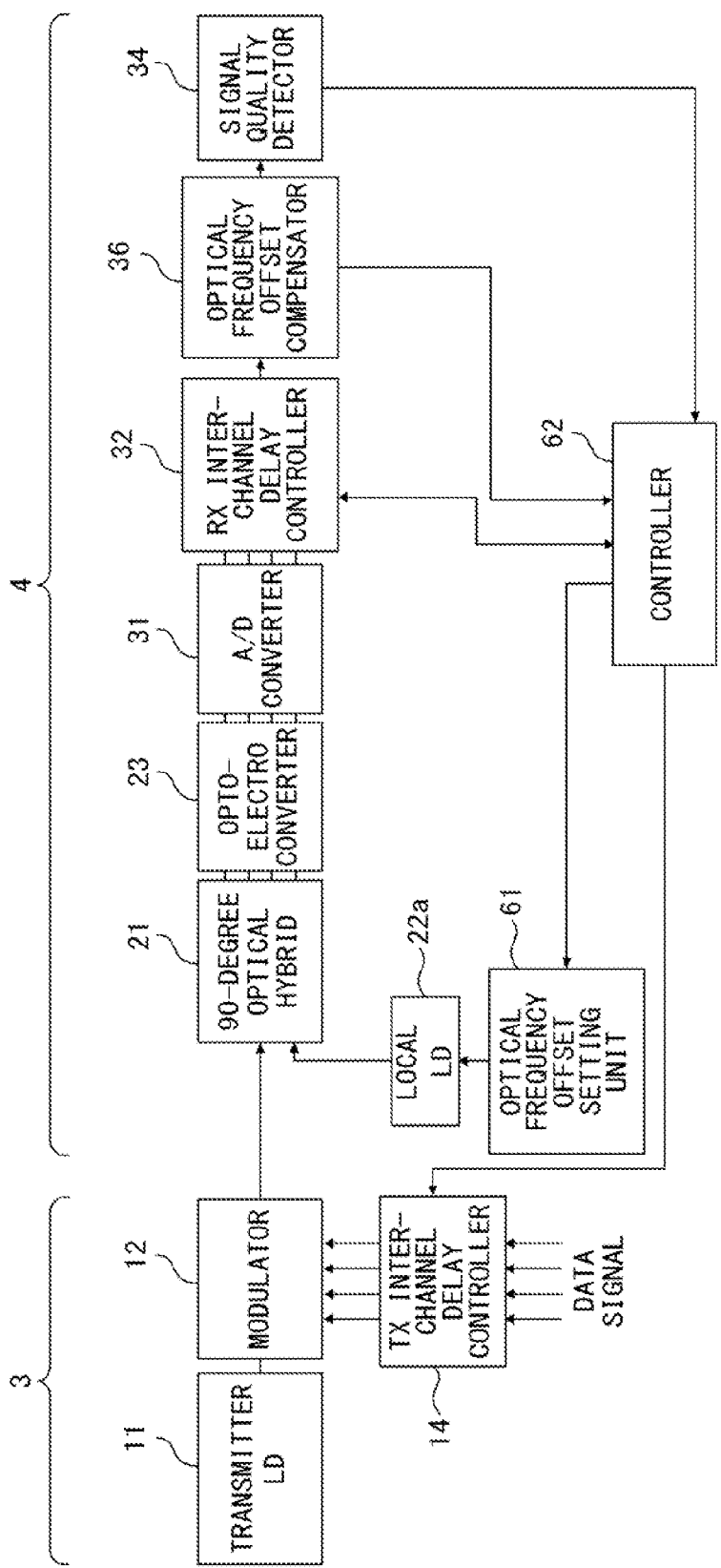
FIG. 16 illustrates a configuration of an optical transmission system for providing a skew suppression method according to a fifth embodiment.

FIG. 16 illustrates a configuration of an optical transmission system for providing a skew suppression method according to a fifth embodiment. The optical transmission system according to the fifth embodiment includes the transmitter 3 illustrated in FIG. 2, the receiver 4 illustrated in FIG. 3, an optical frequency offset setting unit 61, and a controller 62.

The transmitter 3 includes the transmitter LD 11, the modulator 12, and the Tx inter-channel delay controller 14 as in the first embodiment. Thus, an explanation of the transmitter is omitted here. However, the Tx inter-channel delay controller 14 controls a delay amount of each channel (XI, XQ, YI, YQ) in accordance with a command from the controller 62.

The receiver 4 includes the 90-degree optical hybrid circuit 21, a local LD 22a, the opto-electro converter 23, the A/D converter 31, the Rx inter-channel delay controller 32, an optical frequency offset compensator 36, and the signal quality detector 34. The 90-degree optical hybrid circuit 21, the opto-electro converter 23, the A/D converter 31, the Rx inter-channel delay controller 32, and the signal quality detector 34 are substantially the same as in the first embodiment, and thus an explanation thereof is omitted here. However, the Rx inter-channel delay controller 32 controls a delay amount of each channel (XI, XQ, YI, YQ) in accordance with a command from the controller 62.

The local LD 22a generates local light for receiving an optical signal in the 90-degree optical hybrid circuit 21 as well as the local LD 22 according to the first to fourth embodiments. However, the oscillation frequency of the local LD 22a is controlled by the optical frequency offset setting unit 61. In other words, the local LD 22a generates local light having an optical frequency controlled by the optical frequency offset setting unit 61.

The optical frequency offset compensator 36 compensates for the optical frequency offset between the transmitter LD 11 and the local LD 22a by digital signal processing. The processing of detecting the optical frequency offset and compensating for the offset may be performed using a known technique. The optical frequency offset compensator 36 can notify the detected optical frequency offset to the controller 62.

The optical frequency offset setting unit 61 controls the oscillation frequency of the local LD 22a. The optical frequency offset setting unit 61 controls the oscillation frequency of the local LD 22a in accordance with an optical frequency offset (or optical frequency offset change amount) determined by the controller 62. In other words, the optical frequency offset setting unit 61 substantially sets the optical frequency offset between the transmitter LD 11 and the local LD 22a.

The controller 62 controls the optical frequency offset setting unit 61 in accordance with the optical frequency offset detected by the optical frequency offset compensator 36. The controller 62 also controls the skew suppression of the Tx inter-channel delay controller 14 and the Rx inter-channel delay controller 32 based on the Q factor obtained by the signal quality detector 34.

FIG. 17 is a flowchart illustrating the skew suppression method according to the fifth embodiment. The processing illustrated in the flowchart is executed by the controller 62 in a calibration process, in an initial setting, or before shipment of the transmitter 3 and the receiver 4. The controller 62 executes the processing illustrated in the flowchart of FIG. 17 using the optical frequency offset setting unit 61, the Tx inter-channel delay controller 14, and the Rx inter-channel delay controller 32.

In S11, the controller 62 monitors the optical frequency offset. The optical frequency offset is detected by the optical frequency offset compensator 36 and is notified to the controller 62.

In S12, the controller 62 determines whether the optical frequency offset is larger than a specified threshold. As described above with reference to FIG. 15B, the threshold corresponds to the optical frequency at which the optimal skew compensation amount does not substantially depend on the Tx skew.

When the optical frequency offset is smaller than or equal to the threshold, the controller 62 controls the oscillation frequency of the local LD 22a using the optical frequency offset setting unit 61 so that the optical frequency offset is larger than the threshold in S13. Consequently, the optical frequency offset becomes larger than the threshold. When the optical frequency offset is larger than the threshold, S13 is skipped.

The processing in S14 to S17 is substantially the same as the processing in S4 to S7 illustrated in FIG. 7. In other words, the controller 62 suppresses the Tx skew and the Rx skew independently based on the Q factor while the optical frequency offset is sufficiently large.

As described above, the skew of the transmitter 3 and the skew of the receiver 4 can be suppressed independently in the skew suppression method according to the fifth embodiment as in the first to fourth embodiments. Thus, the signal quality is also improved according to the fifth embodiment. In addition, a system for controlling and evaluating the skew is simplified and/or its speed is increased. Further, in the fifth embodiment, a configuration for adding chromatic dispersion or polarization mode dispersion is not necessary.

Sixth to Eighth Embodiments

The sixth to eighth embodiments are variations of the fifth embodiment. The configuration for controlling the optical frequency offset according to fifth to eighth embodiments are different from each other. The sixth to eighth embodiments are different from the fifth embodiment in the following respects. Note that the optical frequency offset compensator 36 is omitted in FIGS. 18 to 20, but the receiver 4 also includes the optical frequency offset compensator 36 in the sixth to eighth embodiments as in the fifth embodiment.

Figure 18:
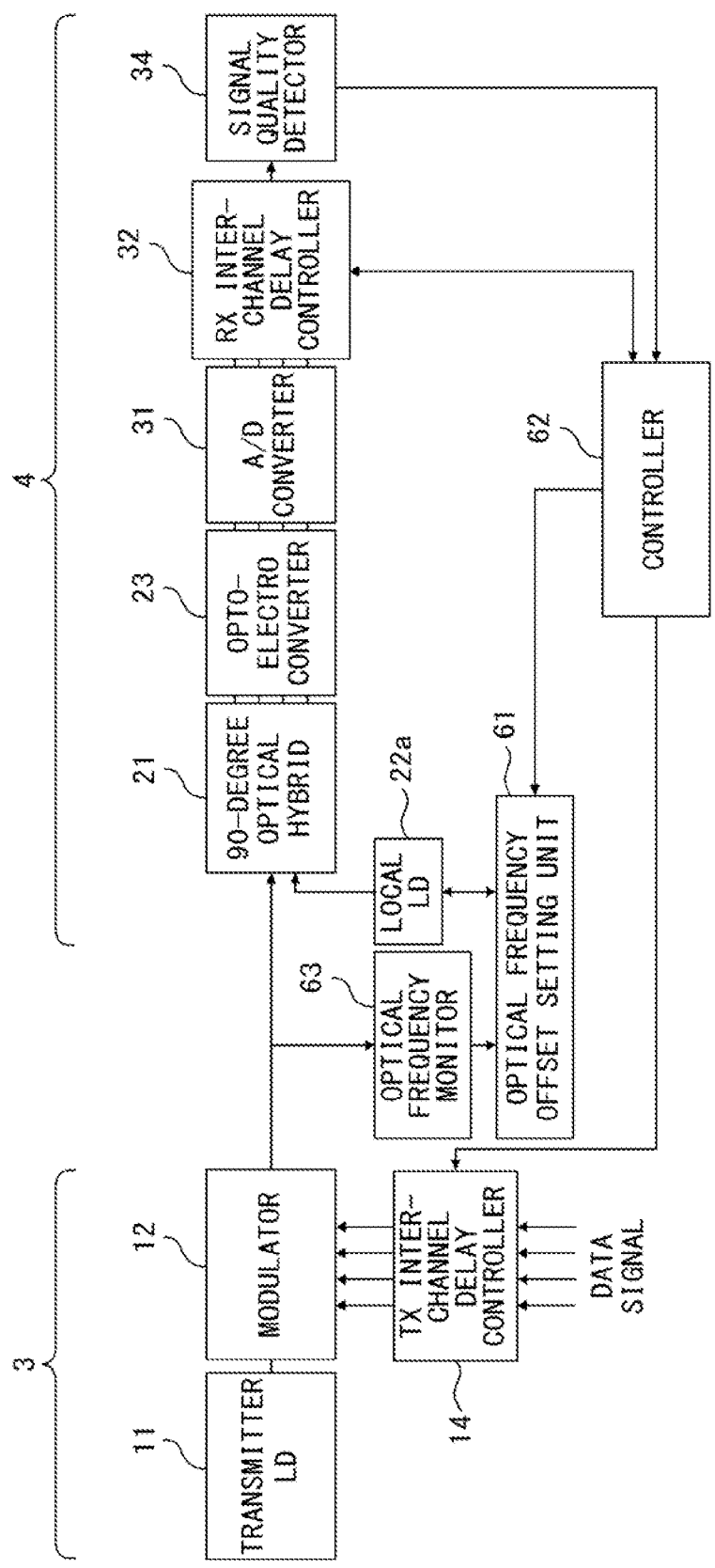
FIG. 18 illustrates a configuration of an optical transmission system for providing a skew suppression method according to a sixth embodiment.

FIG. 18 illustrates a configuration of an optical transmission system for providing a skew suppression method according to the sixth embodiment. In the optical transmission system according to the sixth embodiment, an optical frequency monitor 63 monitors the optical frequency of the optical signal input to the receiver 4. That is, the optical frequency monitor 63 monitors the optical frequency of the transmitter LD 11.

The optical frequency offset setting unit 61 compares the optical frequency of the transmitter LD 11 detected by the optical frequency monitor 63 with the optical frequency of the local light. Upon receiving a command indicating start of skew control from the controller 62, the optical frequency offset setting unit 61 controls the oscillation frequency of the local LD 22a so that the difference between the optical frequencies (i.e., optical frequency offset) is sufficiently large. Consequently, the optical frequency offset is controlled to be sufficiently large, and thus the controller 62 can suppress the Tx skew and the Rx skew independently. When the skew control is terminated, the optical frequency offset setting unit 61 controls the oscillation frequency of the local LD 22a so that the optical frequency offset is zero.

Figure 19:
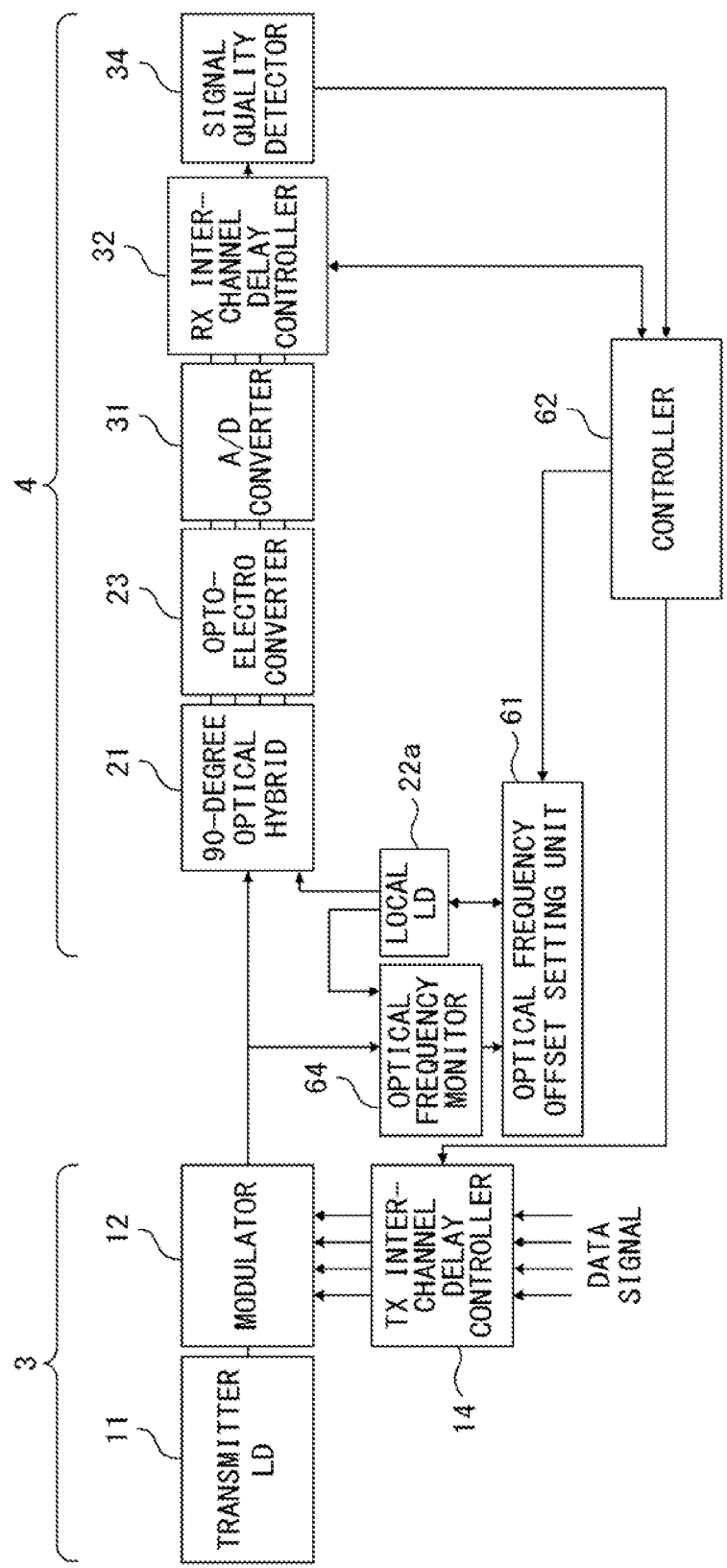
FIG. 19 illustrates a configuration of an optical transmission system for providing a skew suppression method according to a seventh embodiment.

FIG. 19 illustrates a configuration of an optical transmission system for providing a skew suppression method according to the seventh embodiment. Compared to the sixth embodiment, an optical frequency monitor 64 is provided in the seventh embodiment instead of the optical frequency monitor 63.

The optical signal input to the receiver 4 and the local light generated by the local LD 22a are guided to the optical frequency monitor 64. The optical frequency monitor 64 detects an optical frequency offset by monitoring a beat frequency generated by interference between the input signal and the local light. Other configurations and operations are substantially the same as in the fifth and sixth embodiments.

Figure 20:
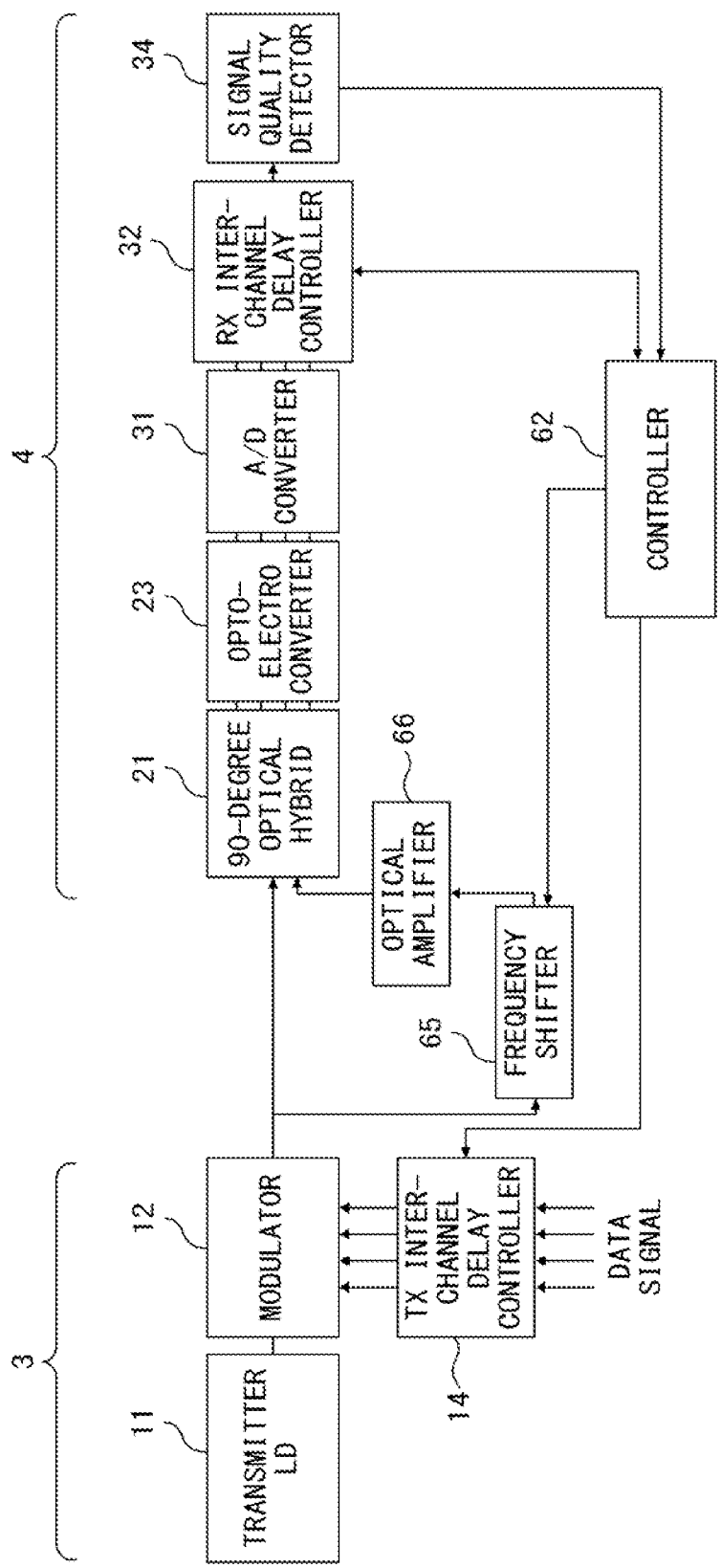
FIG. 20 illustrates a configuration of an optical transmission system for providing a skew suppression method according to an eighth embodiment.

FIG. 20 illustrates a configuration of an optical transmission system for providing a skew suppression method according to the eighth embodiment. In the eighth embodiments, the receiver 4 does not include the local LD and demodulates an input optical signal using the input optical signal. In other words, the receiver 4 receives the input optical signal by a so-called self coherent method.

A frequency shifter 65 controls optical frequency of the input optical signal in accordance with the control of the controller 62. For example, during the skew control, the frequency shifter 65 shifts the optical frequency of the input optical signal so that the optical frequency offset is sufficiently large in accordance with the control of the controller 62. Then, an optical amplifier 66 amplifies frequency shifted light output from the frequency shifter 65. The optical amplifier 66 may be an injection locking LD which oscillates using input light as seeds. However, the optical amplifier 66 is not always required.

As described above, the configurations for adding the optical frequency offset in the fifth to eighth embodiment are different from each other, but the operations for suppressing the Tx skew and the Rx skew independently using the large optical frequency offset are substantially the same. Thus, in the sixth to eighth embodiments, the same effects as in the fifth embodiment are obtained.

9th to 12th Embodiments

In the fifth to eight embodiments, the large optical frequency offset is provided by changing the frequency of light used in the receiver 4 for receiving the optical signal (local light or light generated using the received optical signal). On the other hand, in the ninth to 12th embodiments, a larger optical frequency offset is provided by changing a frequency of carrier light for transmitting an optical signal in the transmitter 3. Note that the optical frequency offset compensator 36 is omitted in FIGS. 22 to 24 (10th to 12th embodiments), but the receiver 4 also includes the optical frequency offset compensator 36 in the 10th to 12th embodiments as in FIG. 21 (ninth embodiment).

FIG. 21 illustrates a configuration of an optical transmission system for providing a skew suppression method according to the ninth embodiment. In the ninth embodiment, the transmitter 3 includes a transmitter LD 11a, the modulator 12, and the Tx inter-channel delay controller 14. In the later-described 10th and 11th embodiments, the transmitter 3 has substantially the same configuration.

The transmitter LD 11a generates carrier light input to the modulator 12 as well as the transmitter LD 11 according to the first to eighth embodiments. However, the oscillation frequency of the transmitter 11a is controlled by the optical frequency offset setting unit 67. In other words, the transmitter LD 11a generates carrier light having an optical frequency controlled by the optical frequency offset setting unit 67.

The oscillation frequency offset setting unit 67 controls the oscillation frequency of the transmitter LD 11a. More specifically, the optical frequency offset setting unit 67 controls the oscillation frequency of the transmitter LD 11a in accordance with an optical frequency offset (or optical frequency offset change amount) determined by the controller 62. In other words, the optical frequency offset setting unit 67 substantially sets an optical frequency offset between the transmitter LD 11a and the local LD 22.

The skew suppression method according to the ninth embodiment corresponds to that according to the fifth embodiment illustrated in FIG. 16. That is to say, the controller 62 controls the optical frequency offset setting unit 67 in accordance with the optical frequency offset detected by the optical frequency offset compensator 36. The controller 62 also controls the skew suppression of the Tx inter-channel delay controller 14 and the Rx inter-channel delay controller 32 based on the Q factor detected by the signal quality detector 34.

FIG. 22 illustrates a configuration of an optical transmission system for providing a skew suppression method according to the tenth embodiment. The skew suppression method according to the tenth embodiment corresponds to that according to the sixth embodiment illustrated in FIG. 18.

In the optical transmission system according to the tenth embodiment, the optical frequency monitor 68 monitors an optical frequency of local light generated by the local LD 22. Then, the optical frequency offset setting unit 67 compares an optical frequency of the carrier light generated by the transmitter LD 11a with an optical frequency of the local light detected by the optical frequency monitor 68. Upon receiving a command indicating start of skew control from the controller 62, the optical frequency offset setting unit 67 controls the oscillation frequency of the transmitter LD 11a so that the difference between the optical frequencies (i.e., optical frequency offset) is sufficiently large. Consequently, the optical frequency offset is controlled to be sufficiently large, and thus the controller 62 can suppress the Tx skew and the Rx skew independently.

Figure 23:
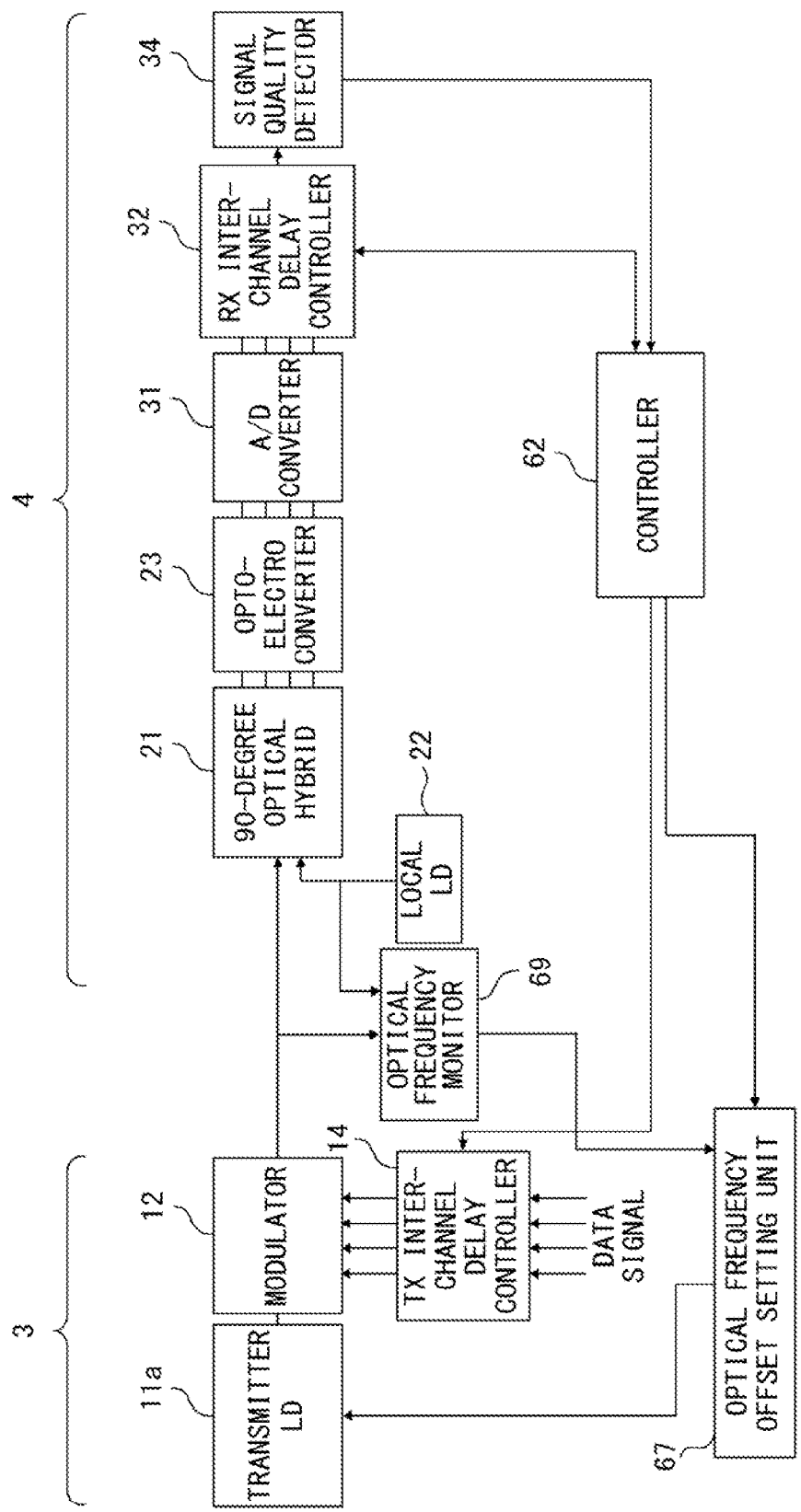
FIG. 23 illustrates a configuration of an optical transmission system for providing a skew suppression method according to an 11th embodiment.

FIG. 23 illustrates a configuration of an optical transmission system for providing a skew suppression method according to the 11th embodiment. The skew suppression method according to the 11th embodiment corresponds to that according to the seventh embodiment illustrated in FIG. 19.

Compared to the tenth embodiment, an optical frequency monitor 69 is provided in the 11th embodiment instead of the optical frequency monitor 68. An optical signal input to the receiver 4 and local light generated by the local LD 22 are guided to the optical frequency monitor 69. The optical frequency monitor 69 detects an optical frequency offset by monitoring a beat frequency generated by interference between the input signal and the local light. Other configurations and operations are substantially the same as in the ninth or tenth embodiment.

FIG. 24 illustrates a configuration of an optical transmission system for providing a skew suppression method according to the 12th embodiment. The skew suppression method according to the 12th embodiment corresponds to that according to the eighth embodiment illustrated in FIG. 20.

In the 12th embodiment, the transmitter 3 does not include the transmitter LD and transmits a signal using local light generated in the receiver 4. The local light generated by the local LD 22 is branched by an optical splitter or the like and is guided to a frequency shifter 70. The frequency shifter 70 controls the optical frequency of the local light to generate carrier light in accordance with the control of the controller 62. The modulator 12 modulates the carrier light with the data signal to generate an optical signal.

For example, during the skew control, the frequency shifter 70 shifts the optical frequency of the local light so that the optical frequency offset is sufficiently large in accordance with the control of the controller 62. The large optical frequency offset is provided with such a configuration. The optical amplifier 66 illustrated in FIG. 20 may be provided between the frequency shifter 70 and the modulator 12 as necessary.

According to the ninth to 12th embodiments, the optical frequency of carrier light is controlled. However, the operation for suppressing the Tx skew and the Rx skew independently using the large optical frequency offset is substantially the same as in the fifth to eighth embodiments. Thus, in the ninth to 12th embodiments, substantially the same effects as in the fifth to eight embodiments are obtained.

The optical frequency of the local light is controlled according to the fifth to eighth embodiments, while the optical frequency of the carrier light is controlled according to the ninth to 12th embodiments. However, the second aspect is not limited to the configuration for controlling either one of the local light and carrier light. The fifth to eighth embodiments and the ninth to 12th embodiments may be combined. At this time, both of the local light and the carrier light are controlled for providing the large optical frequency offset.

13th Embodiment

According to the fifth to 12th embodiments, the large optical frequency offset is provided by directly controlling the optical frequency. On the other hand, according to the 13th embodiment, a large optical frequency offset is provided by controlling a data signal for generating an optical signal.

Figure 25:
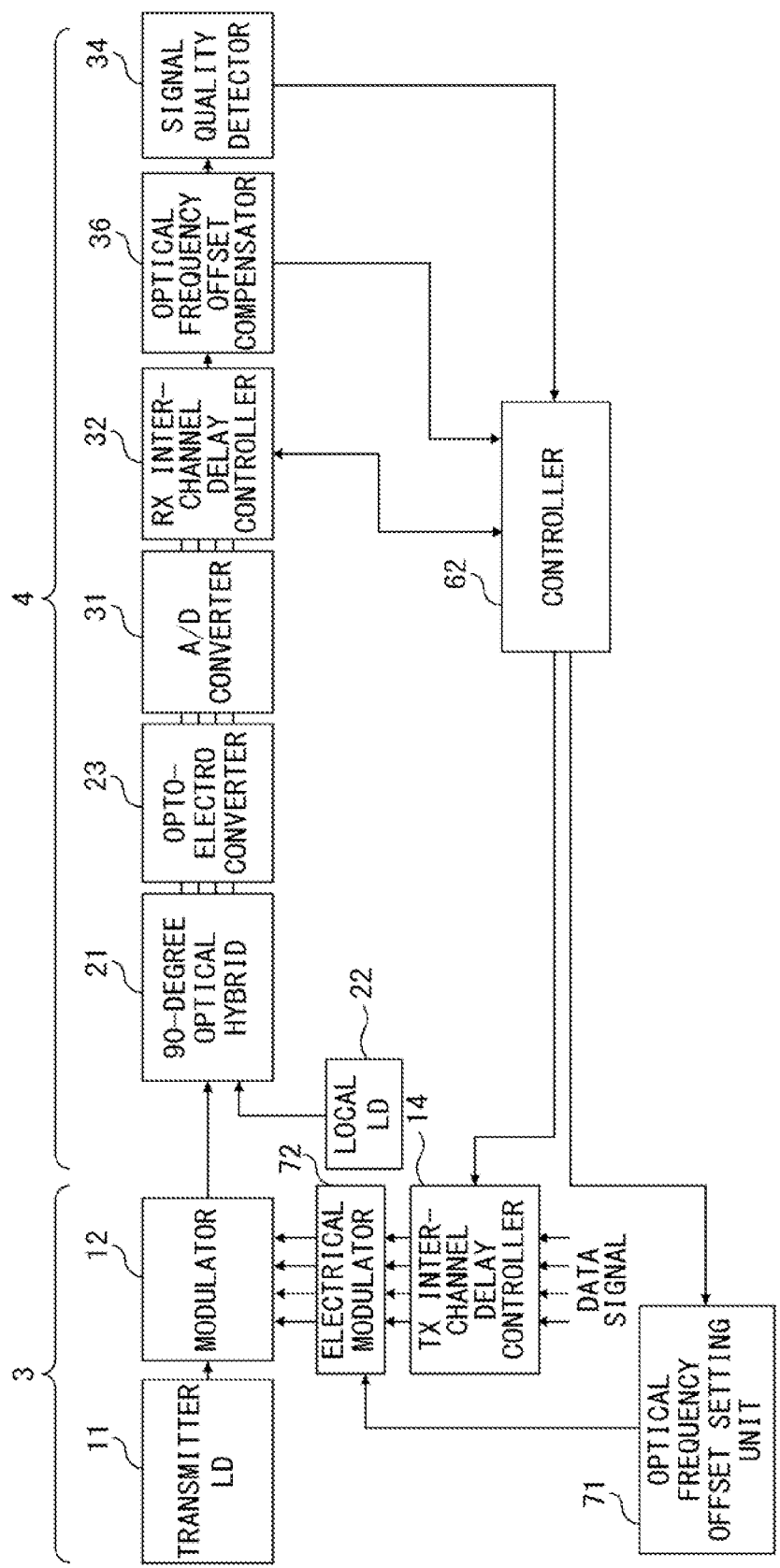
FIG. 25 illustrates a configuration of an optical transmission system for providing a skew suppression method according to a 13th embodiment.

FIG. 25 illustrates a configuration of an optical transmission system for providing a skew suppression method according to the 13th embodiment. In the 13th embodiment, the transmitter 3 includes an electrical modulator 72. The electrical modulator 72 is provided between the Tx inter-channel delay controller 14 and the modulator 12 in FIG. 25, but may be provided at an input side of the Tx inter-channel delay controller 14.

The controller 62 controls the optical frequency offset setting unit 71 in accordance with the optical frequency offset detected by the optical frequency offset compensator 36 as in the fifth embodiment. The optical frequency offset setting unit 71 controls the signal processing of the electrical modulator 72. For example, the optical frequency offset setting unit 71 controls the signal processing of the electrical modulator 72 in accordance with an optical frequency offset (or optical frequency offset change amount) determined by the controller 62. In other words, the optical frequency offset setting unit 71 substantially sets an optical frequency offset between the transmitter LD 11 and the local LD 22.

The electrical modulator 72 is realized by, for example, a digital filter. In this case, the electrical modulator 72 shifts the optical frequency by appropriately controlling tap coefficients. By processing the data signal using the tap coefficients updated in accordance with the control of the optical frequency offset setting unit 71, the optical frequency of the carrier light is substantially controlled, thereby providing a large optical frequency offset.

In the example illustrated in FIG. 25, the optical frequency offset is monitored by using the digital signal processing (i.e., the optical frequency offset compensator 36), but the optical frequency offset may be monitored by other methods. The configuration for monitoring the optical frequency of each LD as illustrated in FIG. 22 or the configuration for using the bead frequency by the interference as illustrated in FIG. 23 may be applied to the 13th embodiment.

<Third Aspect>

According to the first aspect, large dispersion (for example, chromatic dispersion, polarization mode dispersion) is added to the optical signal to suppress the Tx skew and the Rx skew independently. According to the second aspect, the optical frequency offset between the carrier light and the local light is controlled. On the other hand, according to the third aspect, an optical phase difference between carrier light and local light is controlled to suppress the Tx skew and the Rx skew independently.

FIG. 26 illustrates a relationship among skew, optical phase difference, and Q factor. In FIG. 26, the horizontal axis indicates a skew compensation amount in the receiver 4. The vertical axis indicates the Q factor. The optical phase difference denoted by ΔPhase indicates a difference between an optical phase of carrier light and an optical phase of local light.

The graph illustrated in FIG. 26 is obtained by simulations under the following conditions. The chromatic dispersion of the optical transmission line between the transmitter 3 and the receiver 4 is zero. The optical frequency offset is zero. The Tx skew and the Rx skew are +9 ps. The line width of the transmitter LD 11 and the local LD 22 is 100 kHz. The optical signal-to-noise ratio (OSNR) is 15 dB.

In the case where the optical phase difference is zero in the simulations, the Q factor is optimized when the skew compensation amount in the receiver 4 is approximately −18 ps. Here, a sum of the Tx skew and the Rx skew is 18 ps. In other words, the Q factor is optimized by compensating for the sum of the Tx skew and the Rx skew when the optical phase difference is zero.

When the optical phase difference is 25 degrees, the optimal skew compensation amount is a little shifted from the one that is obtained when the optical phase difference is zero. When the optical phase difference is 45 degrees, the optimal skew compensation amount is largely shifted from the one that is obtained when the optical phase difference is zero.

Figure 27A:
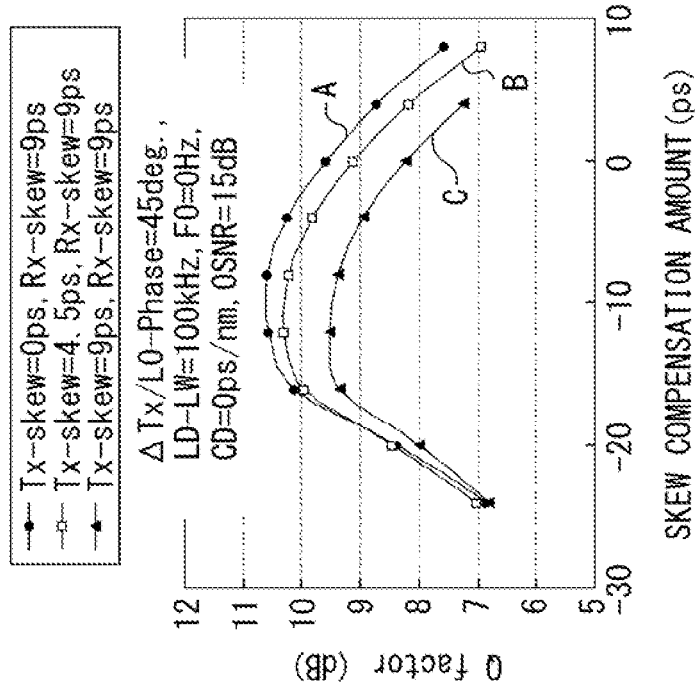
FIGS. 27A and 27B illustrate a relationship among Tx skew, Rx skew, and skew compensation amount with respect to the optical phase difference.
Figure 27B:
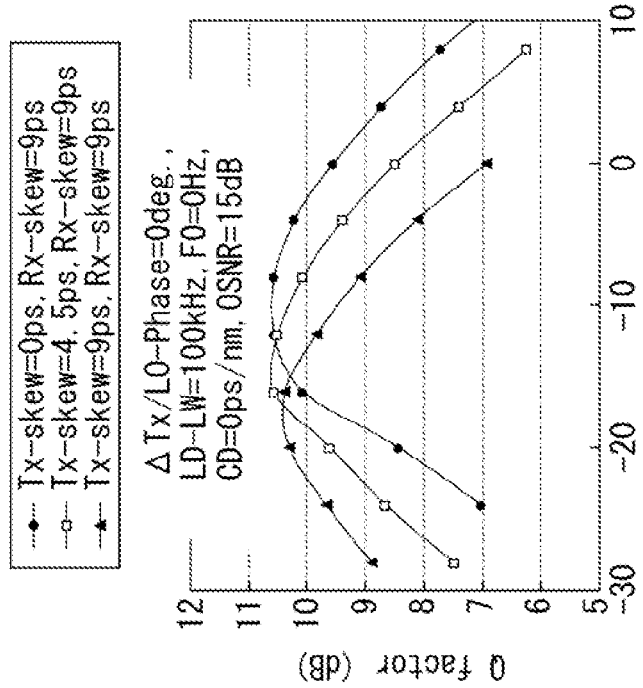

FIGS. 27A and 27B illustrate a relationship among Tx skew, Rx skew, and skew compensation amount with respect to the optical phase difference. The simulation results illustrated in FIGS. 27A and 27B are obtained under substantially the same conditions as illustrated in FIG. 26. In FIG. 27A, the Tx skew is changed under while the optical phase difference is zero. In FIG. 27B, the Tx skew is changed while the optical phase difference is 45 degrees. In addition, the Rx skew is constant (9 ps) in FIGS. 27A and 27B.

The optimal skew compensation amount depends on the Tx skew when the optical phase difference is zero degree as illustrated in FIG. 27A. More specifically, the optimal skew compensation amount is approximately −9 ps, −14 ps, and −18 ps when the Tx skew is 0 ps/nm, 4.5 ps/nm, and 9 ps/nm, respectively.

On the other hand, the optimal skew compensation amount does not substantially depend on the Tx skew when the optical phase difference is 45 degree as illustrated in FIG. 27B. When the Rz skew is constant, the optimal skew compensation amount is hardly changed when the Tx skew is changed. In the example illustrated in FIG. 27B, the optimal skew compensation amount is approximately −10 ps when the Tx skew is 0 ps/nm, 4.5 ps/nm, and 9 ps/nm.

When the optical phase difference is 45 degrees, the optimal skew compensation amount hardly depends on the Tx skew and is substantially decided depending on the Rx skew. By controlling the optical phase difference to be 45 degrees in the optical transmission system for transmitting the optical signal from the transmitter 3 to the receiver 4, the skew between I/Q generated in the receiver 4 can be detected and suppressed irrespective of the transmitter 3.

The simulations are conducted when the optical phase difference is 45 degrees in FIG. 27B, but it is not required that the optical phase difference is exactly 45 degrees. By controlling the optical phase difference to be approximately 45 degrees, the optimal skew compensation amount hardly depends on the Tx skew. The optical phase difference is not limited to approximately 45 degrees, but may be approximately 45+nπ/2 degrees. n is an integer including zero. The following explanation will proceed with n=0.

As described above, the optimal skew compensation amount does not substantially depend on the Tx skew when the optical phase difference is approximately 45 degrees. However, the Q factor depends on the Tx skew when the optical phase difference is approximately 45 degrees as illustrated in FIG. 27B. For example, compared to the Q factor (characteristic A) when the Tx skew is 0 ps, the Q factor (characteristic B) when the Tx skew is 4.5 ps is low. The Q factor (characteristic C) when the Tx skew is 9 ps is further reduced. In other words, the Q factor can be improved by suppressing the Tx skew in the transmitter 3.

According to the third aspect, the Tx skew and the Rx skew are suppressed independently by controlling the optical phase difference to be approximately 45 degrees. Thus, the skew suppression method according to the third aspect conducts the following controlling steps.
(1) controlling the optical phase difference to be approximately 45 degrees;
(2) determining the optimal skew compensation amount while monitoring the Q factor to suppress the Rx skew; and
(3) suppressing the Tx skew while monitoring the Q factor.

The order of conducting the steps (2) and (3) is not particularly limited. The step (2) may be conducted prior to the step (3), or the step (3) may be conducted prior to the step (2). The steps (2) and (3) may be alternately conducted repeatedly. Alternatively, either one of the steps (2) and (3) may be conducted. 14th to 15th embodiments according to the third aspect will be explained below.

14th and 15th Embodiments

Figure 28:
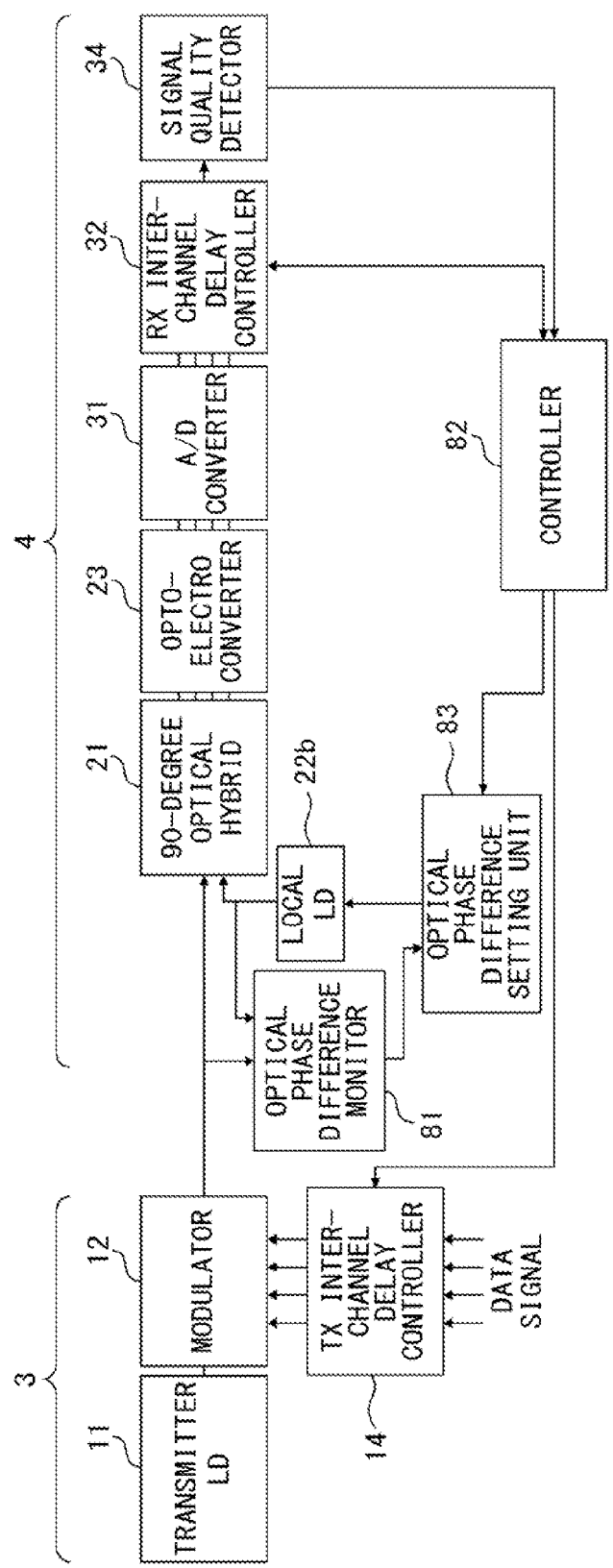
FIG. 28 illustrates a configuration of an optical transmission system for providing a skew suppression method according to a 14th embodiment.

FIG. 28 illustrates a configuration of an optical transmission system for providing a skew suppression method according to the 14th embodiment. The optical transmission system according to the 14th embodiment includes the transmitter 3 illustrated in FIG. 2, the receiver 4 illustrated in FIG. 3, an optical phase difference monitor 81, a controller 82, and an optical phase difference setting unit 83.

The transmitter 3 includes the transmitter LD 11, the modulator 12, and the Tx inter-channel delay controller 14 as in the first embodiment. Thus, an explanation of the transmitter is omitted here. However, the Tx inter-channel delay controller 14 controls a delay amount of each channel (XI, XQ, YI, YQ) in accordance with a command from the controller 82.

The receiver 4 includes the 90-degree optical hybrid circuit 21, a local LD 22b, the opto-electro converter 23, the A/D converter 31, the Rx inter-channel delay controller 32, and the signal quality detector 34. The 90-degree optical hybrid circuit 21, the opto-electro converter 23, the A/D converter 31, the Rx inter-channel delay controller 32, and the signal quality detector 34 are substantially the same as in the first embodiment, and thus an explanation thereof is omitted here. However, the Rx inter-channel delay controller 32 controls a delay amount of each channel (XI, XQ, YI, YQ) in accordance with a command from the controller 82.

The local LD 22b generates local light guided to the 90-degree optical hybrid circuit 21 as well as the local LD 22 according to the first to fourth embodiments. However, the optical phase of the local LD 22b is controlled by the optical phase difference setting unit 83. More specifically, the local LD 22b generates local light with an optical phase controlled by the optical phase difference setting unit 83.

The optical phase difference monitor 81 compares the optical phase of the received optical signal with the optical phase of the local light generated by the local LD 22b. In other words, the optical phase difference monitor 81 monitors an optical phase difference between carrier light and local light.

Upon receiving a command indicating start of skew control from the controller 82, the optical phase difference setting unit 83 controls an oscillation phase of the local LD 22b so that the optical phase difference is approximately 45 degrees. Consequently, the optical phase difference between the carrier light and the local light is controlled to be approximately 45 degrees, and thus the controller 82 can suppress the Tx skew and the Rx skew separately.

Figure 29:
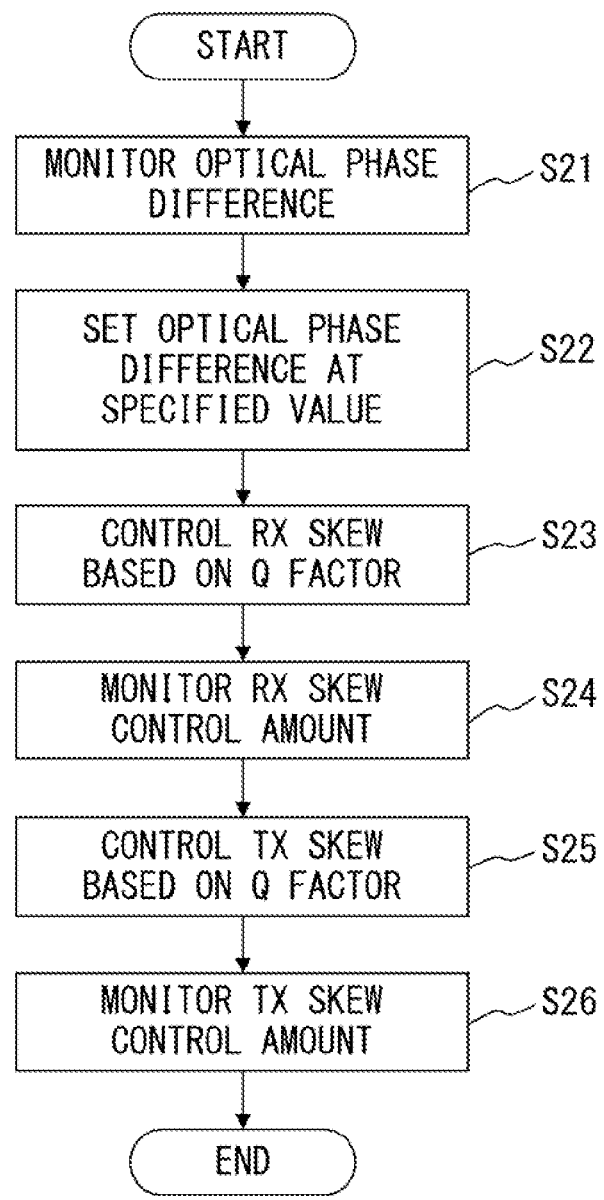
FIG. 29 is a flowchart illustrating the skew suppression method according to the 14th embodiment.

FIG. 29 is a flowchart illustrating the skew suppression method according to the 14th embodiment. The processing illustrated in the flowchart is executed by the controller 82 and the optical phase difference setting unit 83 in a calibration process, in an initial setting, or before shipment of the transmitter 3 and the receiver 4.

In S21, the optical phase difference setting unit 83 detects the optical phase difference. The optical phase difference is monitored by the optical phase difference monitor 81. Then in S22, the optical phase difference setting unit 83 controls the oscillation phase of the local LD 22b so that the optical phase difference is approximately 45 degrees. When the detected optical phase difference is approximately 45 degrees, the optical phase difference setting unit 83 maintains the oscillation state of the local LD 22b.

The processing in S23 to S26 is substantially the same as S4 to S7 illustrated in FIG. 7. In other words, the controller 82 suppresses the Tx skew and the Rx skew independently based on the Q factor while the optical phase difference is maintained at 45 degrees.

As described above, the skew of the transmitter 3 and the skew of the receiver 4 can be suppressed independently in the skew suppression method according to the 14th embodiment as in the first to 13th embodiments. Thus, the signal quality is also improved according to the 14th embodiment. Also, a system for controlling and evaluating the skew is simplified and/or its speed is increased.

Figure 30:
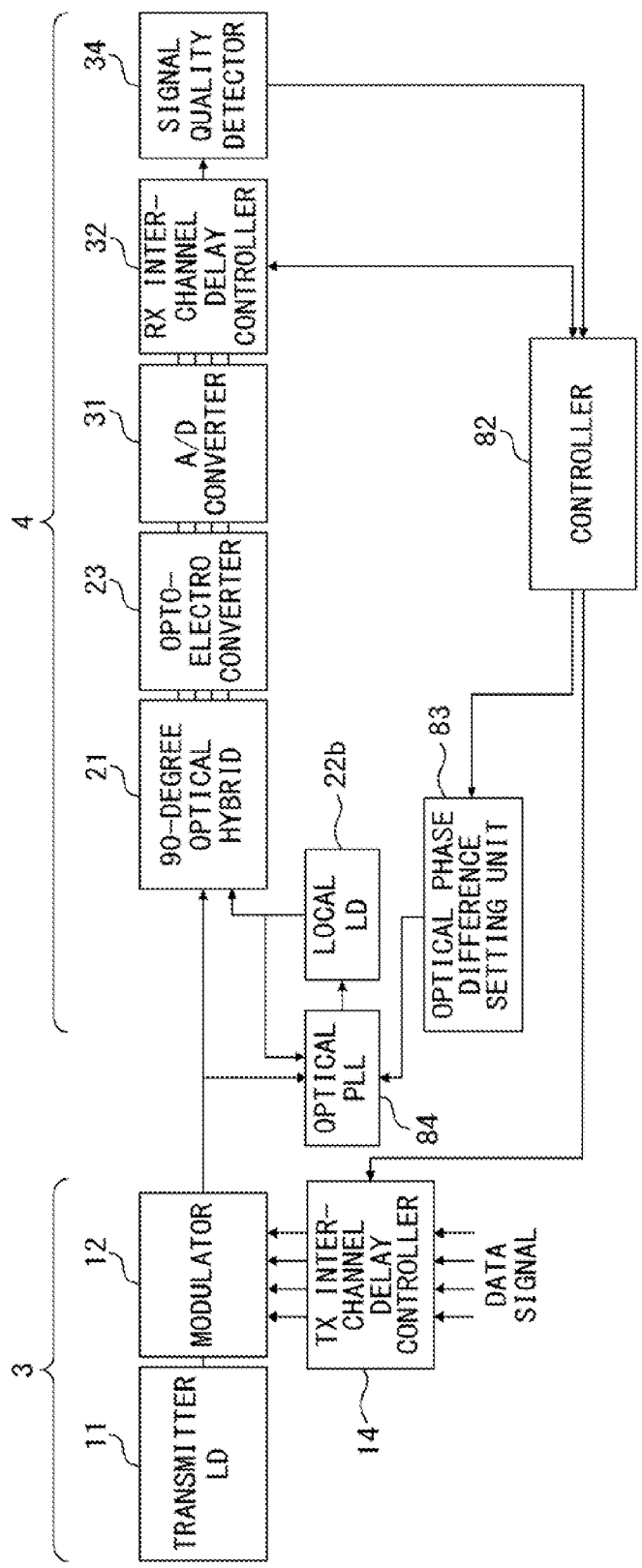
FIG. 30 illustrates a configuration of an optical transmission system for providing a skew suppression method according to a 15th embodiment.

FIG. 30 illustrates a configuration of an optical transmission system for providing a skew suppression method according to the 15th embodiment. In the optical transmission system according to the 15th embodiment, the optical phase difference is controlled to be 45 degrees using an optical PLL device 84.

The optical PLL device 84 controls the local LD 22b to obtain a phase difference specified by the optical phase difference setting unit 83. During the skew suppression control, the optical phase difference setting unit 83 specifies the optical phase difference to be 45 degrees. Then, the optical PLL device 84 controls the oscillation phase of the local LD 22b so that the optical phase difference is approximately 45 degrees. Consequently, the optical phase difference is controlled to be approximately 45 degrees, and thus the controller 82 can suppress the Tx skew and the Rx skew independently based on the Q factor.

<System Operation and Skew Suppression>

Figure 31:
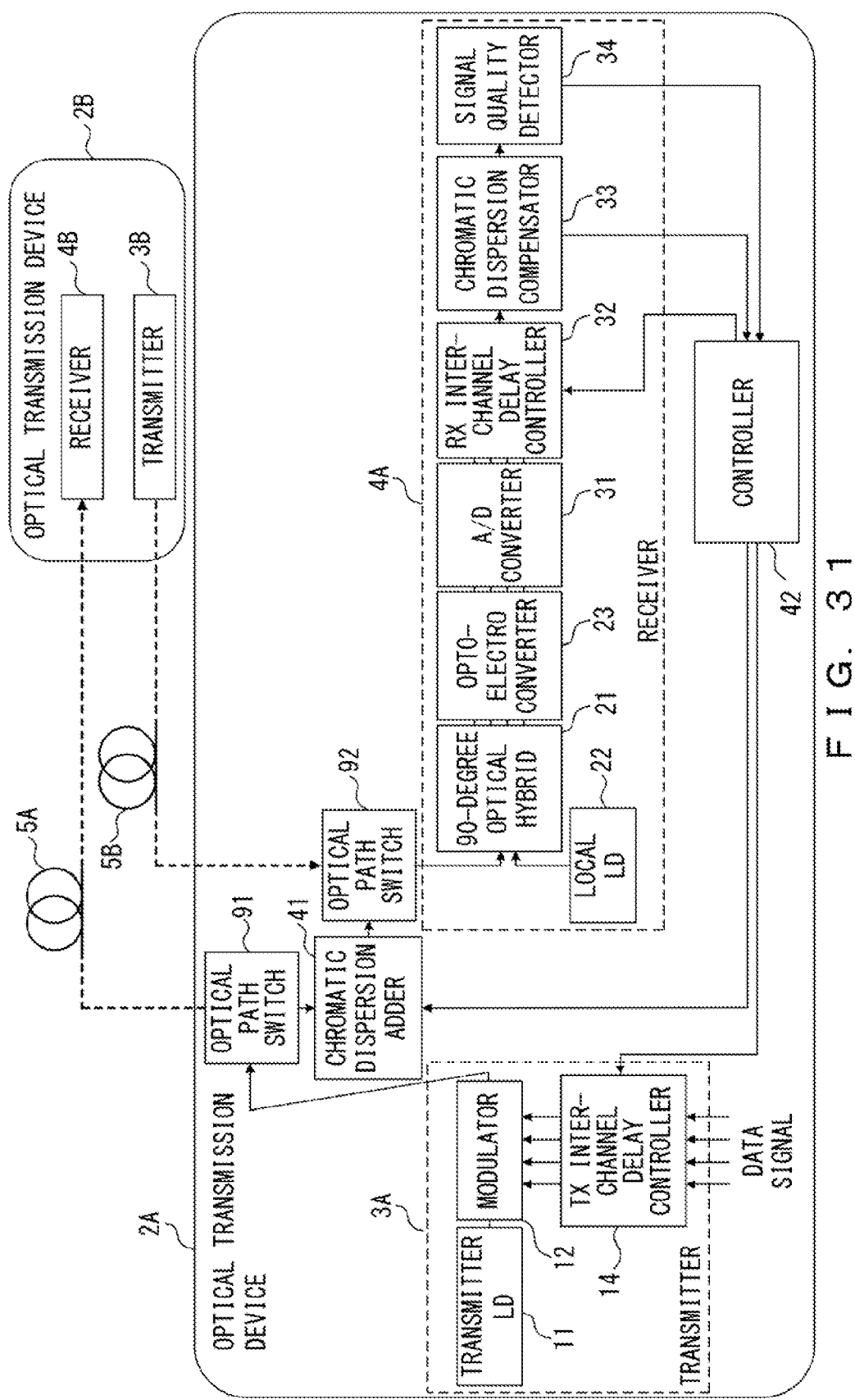
FIG. 31 illustrates an operation of an optical transmission system and skew suppression.

FIG. 31 illustrates an operation of an optical transmission system and skew suppression. The optical transmission system illustrated in FIG. 31 includes optical transmission devices 2A and 2B that are located at different sites. The optical transmission device 2A includes a transmitter 3A and a receiver 4A, and the optical transmission device 2B includes a transmitter 3B and a receiver 4B.

The transmitter 3A and the receiver 4A in the optical transmission device 2A are the same as the transmitter 3 and the receiver 4 illustrated in FIG. 6. The optical transmission device 2A also includes the chromatic dispersion adder 41 and the controller 42 illustrated in FIG. 6. The optical transmission device 2A further includes optical path switches 91 and 92. The configuration of the optical transmission device 2B is substantially the same as the optical transmission device 2A, and thus an explanation thereof is omitted.

The optical path switch 91 guides an optical signal output from the transmitter 3A to an optical transmission line 5A or the chromatic dispersion adder 41 in accordance with the control of the controller 42. For example, in transmitting data, the optical path switch 91 guides the optical signal output from the transmitter 3A to the optical transmission line 5A. In skew suppression control, the optical path switch 91 guides the optical signal output from the transmitter 3A to the chromatic dispersion adder 41.

The optical path switch 92 selects an optical signal received via an optical transmission line 5B or an optical signal output from the chromatic dispersion adder 41 in accordance with the control of the controller 42 and guides the selected signal to the 90-degree optical hybrid circuit 21. For example, in transmitting data, the optical path switch 92 guides the optical signal received via the optical transmission line 5B to the 90-degree optical hybrid circuit 21. In skew suppression control, the optical path switch 92 guides the optical signal output from the chromatic dispersion adder 41 to the 90-degree optical hybrid circuit 21.

Figure 32:
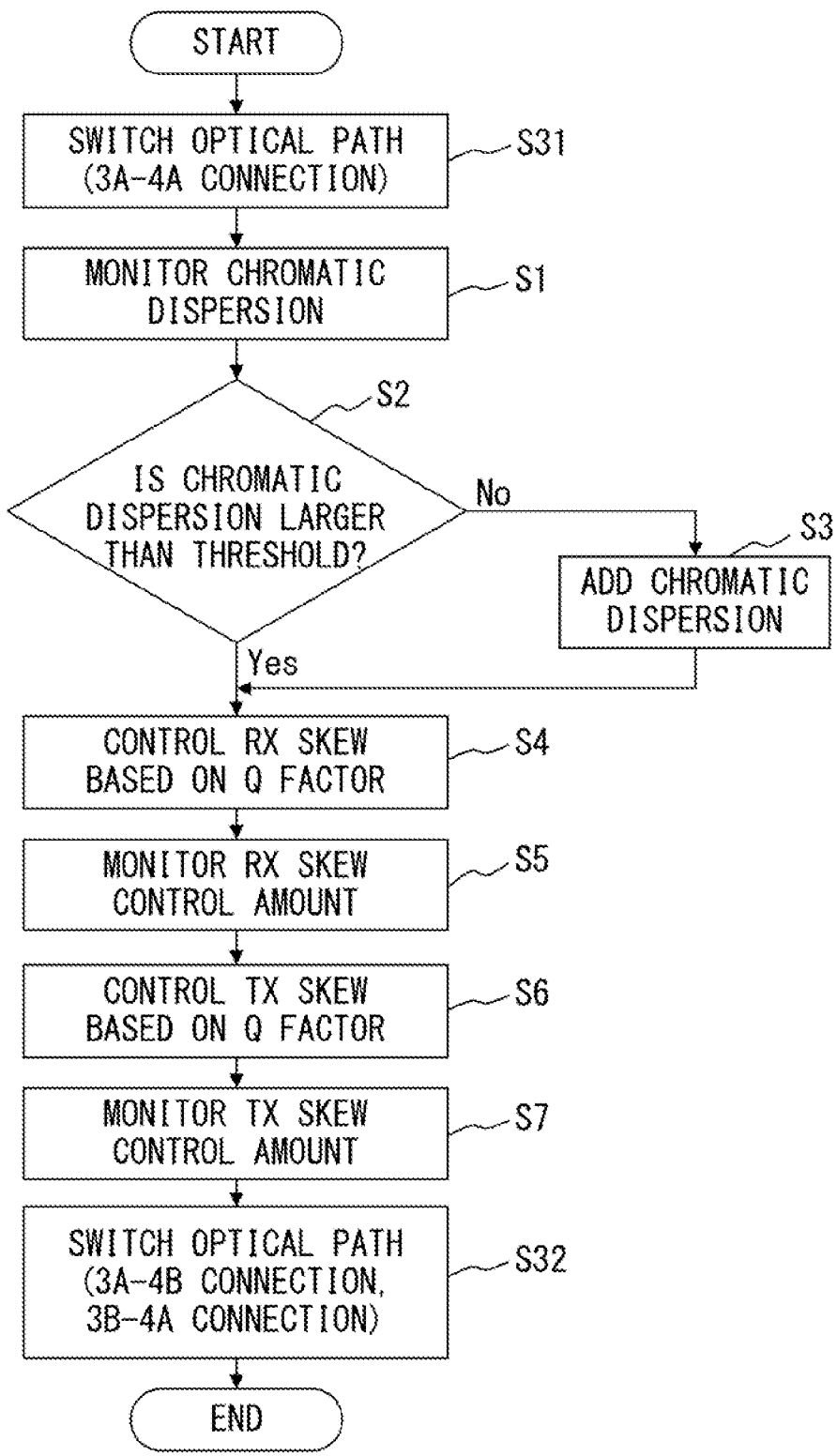
FIG. 32 is a flowchart illustrating a skew suppression method in the system illustrated in FIG. 31.

FIG. 32 is a flowchart illustrating a skew suppression method in the system illustrated in FIG. 31. The processing illustrated by the flowchart is executed, for example, before the optical transmission system starts the operation of data transmission. Alternatively, the processing illustrated by the flowchart may be executed during maintenance while the operation of the optical transmission system is temporarily terminated. In the following description, the skew is suppressed in the optical transmission device 2A, but the skew may be suppressed in both of the optical transmission devices 2A and 2B.

In S31, the controller 42 controls the optical path switches 91 and 92 to guide the optical signal output from the transmitter 3A to the receiver 4A. Accordingly, the optical path switch 91 guides the optical signal output from the transmitter 3A to the chromatic dispersion adder 41. The optical path switch 92 guides the optical signal output from the chromatic dispersion adder 41 to the 90-degree optical hybrid circuit 21. In other words, by such optical path switching, the optical signal output from the transmitter 3A is guided to the receiver 4A via the chromatic dispersion adder 41.

S1 to S7 are already explained with reference to FIG. 7. That is to say, the sufficiently large chromatic dispersion is added to the optical signal guided from the transmitter 3A to the receiver 4A. By so doing, the skew between I/Q generated in the transmitter 3A and the skew between I/Q generated in the receiver 4A are independently suppressed.

In S32, the controller 42 controls the optical path switch 91 to guide the optical signal output from the transmitter 3A to the receiver 4B. The controller 42 also controls the optical path switch 92 to guide the optical signal transmitted from the transmitter 3B to the receiver 4A. By so doing, a bidirectional link is established between the optical transmission devices 2A and 2B. Then, the optical transmission devices 2A and 2B transmit data using the bidirectional link.

In the example illustrated in FIGS. 31 and 32, the configuration according to the first embodiment is adopted, but the configuration according to the second to 15th embodiments may be adopted. In other words, the configuration for increasing the polarization mode dispersion or the optical frequency offset may be adopted in the system illustrated in FIG. 31. Alternatively, the configuration for controlling the optical phase difference at a specified value may be adopted in the system illustrated in FIG. 31.

In an optical transmission system including active system and standby system, a skew is suppressed by looping back an optical signal output from a transmitter of the active system to a receiver of the standby system and/or looping back an optical signal output from a transmitter of the standby system to a receiver of the active system.

Other Embodiments

While the skew suppressing operation is performed, an optical transmission system may transmit a signal with a modulation scheme different from when performing actual data communication. For example, in a calibration process, the transmitter 3 and the receiver 4 transmit an optical signal with a modulation scheme (QPSK or the like) in which information quantity per symbol is small. By performing the calibration using the modulation scheme in which the information quantity per symbol is small, the procedure for optimization is easily started due to characteristic margin even when the transmitter is not optimized. In such a transmission state, a basic device parameter such as a skew is adjusted. After the skew suppression control is terminated, the transmitter 3 and the receiver 4 may transmit data with a modulation scheme (16QAM or the like) in which information quantity per symbol is large.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has (have) been described in detail, it should be understood that the various changes, substitutions, and alterations could be made hereto without departing from the spirit and scope of the invention.

What is claimed is:

1. A method for suppressing a skew between a first channel and a second channel in an optical transmission system having a transmitter that transmits an optical signal with the first channel and the second channel and a receiver that receives the optical signal, the method comprising:

controlling dispersion added to the optical signal to be larger than a specified amount;

controlling a delay time of at least one of the first channel and the second channel in the receiver based on a quality of the optical signal monitored in the receiver to suppress the skew between the first channel and the second channel in the receiver; and controlling a delay time of at least one of the first channel and the second channel in the transmitter based on a quality of the optical signal monitored in the receiver to suppress the skew between the first channel and the second channel in the transmitter.

2. The method according to claim 1, wherein the specified amount is dispersion at which the delay time of at least one of the first channel and the second channel in the receiver for optimizing the quality of the optical signal does not substantially depend on the skew in the transmitter.

3. The method according to claim 1, wherein the dispersion is chromatic dispersion or polarization mode dispersion.

4. The method according to claim 1, wherein the first channel and the second channel are an I channel and a Q channel, respectively.

5. A method for suppressing a skew between a first channel and a second channel in at least one of a transmitter that transmits an optical signal with the first channel and the second channel and a receiver that receives the optical signal, the method comprising:

controlling dispersion added to the optical signal to be larger than a specified amount; and performing at least one of first control to control a delay time of at least one of the first channel and the second channel in the receiver based on a quality of the optical signal monitored in the receiver to suppress the skew between the first channel and the second channel in the receiver, and second control to control a delay time of at least one of the first channel and the second channel in the transmitter based on a quality of the optical signal monitored in the receiver to suppress the skew between the first channel and the second channel in the transmitter.

6. An optical transmission system having a transmitter that transmits an optical signal with a first channel and a second channel and a receiver that receives the optical signal, comprising:

a dispersion adder that adds dispersion to the optical signal; and a controller that controls a delay time of at least one of the first channel and the second channel in the receiver based on a quality of the optical signal monitored in the receiver to suppress the skew between the first channel and the second channel in the receiver, and controls a delay time of at least one of the first channel and the second channel in the transmitter based on a quality of the optical signal monitored in the receiver to suppress the skew between the first channel and the second channel in the transmitter.

7. The optical transmission system according to claim 6, wherein the dispersion adder is provided between the transmitter and the receiver to optically add dispersion to the optical signal.

8. The optical transmission system according to claim 6, wherein the dispersion adder is a digital filter to apply a distortion equivalent to the dispersion added to the optical signal to an electrical signal that modulates carrier light in the transmitter.

* * * * *